US007715396B2

(12) United States Patent
Castro et al.

(10) Patent No.: US 7,715,396 B2
(45) Date of Patent: May 11, 2010

(54) NETWORK ROUTING

(75) Inventors: Miguel Castro, Cambridge (GB); Antony Ian Taylor Rowstron, Cambridge (GB); Matthew Caesar, Santa Rosa, CA (US)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 11/118,240

(22) Filed: Apr. 28, 2005

(65) Prior Publication Data

US 2006/0039371 A1 Feb. 23, 2006

Related U.S. Application Data

(60) Provisional application No. 60/602,770, filed on Aug. 19, 2004.

(51) Int. Cl.
*H04L 12/56* (2006.01)
*H04J 1/16* (2006.01)

(52) U.S. Cl. ............... 370/392; 370/386; 370/254

(58) Field of Classification Search ........... 370/237, 370/238, 252, 389, 386, 392, 254; 709/238–244
See application file for complete search history.

(56) References Cited

U.S. PATENT DOCUMENTS

| 6,473,405 | B2 | 10/2002 | Ricciulli |
| 6,611,872 | B1 | 8/2003 | McCanne |
| 6,718,394 | B2 | 4/2004 | Cain |
| 2004/0054807 | A1 * | 3/2004 | Harvey et al. ............... 709/243 |
| 2004/0085912 | A1 | 5/2004 | Xu et al. |
| 2004/0264422 | A1 | 12/2004 | Calcev et al. |
| 2005/0015511 | A1 | 1/2005 | Izmailov et al. |
| 2006/0233155 | A1 * | 10/2006 | Srivastava ................... 370/351 |

FOREIGN PATENT DOCUMENTS

| EP | 1398924 A2 | 3/2004 |
| EP | 1398924 A3 | 3/2004 |
| EP | 1467524 A1 | 10/2004 |

OTHER PUBLICATIONS

Aguayo et al., "Link-Level Measurements from an 802.11 mesh network," ACM SIGCOMM '04, vol. 34, issue 4, Aug. 2004, pp. 121-132.

(Continued)

*Primary Examiner*—John Pezzlo

(57) ABSTRACT

To reduce the dependency of overlay networks on underlay networks to route messages, a virtual ring routing architecture may be formed that leverages the design of the overlay network to achieve their desirable scaling and robustness properties but also reduce the dependency on any underlay network to setup and maintain connectivity. More particularly, each node may have a single, fixed, location independent node identifier, to organize the nodes into a virtual ring. The connectivity between nodes through the actual network topology may be formed by a plurality of nodes in the virtual ring by maintaining connectivity to those nodes identified as virtual neighbor nodes within the virtual ring. The path segments defining communication connections between virtual neighbor nodes may be used to route messages between any pair of nodes in the network and may reduce route discovery overhead, reduce delay in transmission, and reduce or eliminate flooding to setup or maintain the path segments.

19 Claims, 19 Drawing Sheets

OTHER PUBLICATIONS

Broch et al., "A performance comparison of multi-hop wireless ad hoc netowrk routing protocols," MobiCom, Oct. 1998, pp. 85-97.
Castro et al., "Secure routing for structured peer-to-peer overlay networks," USENIX OSDI, Dec. 2002.
Castro et al., "Performance and dependability of structured peer-to-peer overlays," Dependable Systems and Netowrks, Jun. 2004.
Chen et al., "L+: scalable landmark routing and address lookup for multi-hop wireless networks," MIT LCS Technical Report 837, Mar. 2002.
Chung et al., "NS by example," http://nile.edu/NS/, 2004.
Douceur, "the sybil attack," IPTPS, Mar. 2002.
Draves et al. Comparison of routing metrics for static multi-hop wireless networks, SIGCOMM '04, Aug. 2004, pp. 133-144.
Eriksson et al., Peernet: pushing peer-to-peer down the stack: IPTPS, Mar. 2003.
Fonseca et al., "Beacon vector routing: scalable point-to-point in wireless sensornets," Intel Reasearch IRB-TR-04-011, May 2004.
Perkins et al., "Highly dynamic destination-sequenced distance-vector routing (dsdv) for mobile computers," SIGCOMM '94, Aug. 1994, pp. 234-244.
Perkins et al., "Ad hoc on-demand distance vector routing," Mobile Computing systems and applications, Feb. 1999, pp. 90-100.
Ramaqsubramanian et al., "Sharp: a hybrid adaptive routing protocol for mobile ad-hoc networks," ACM Mobihoc '03, Jun. 2003.
Ratnasamy et al., "A scalable content-addressable network," SiGCOMM '01, Aug. 2001, pp. 161-172.
Ratnasamy et al., "Ght: a geographic hash table for data-centric storage," ACM Wireless Sensor Networks and applications, Sep. 2002, pp. 78-87.
Rowstron et al., "Pastry: scalable, distributed object location and routing for large-scale peer-to-peer systems," IFIP/ACM Distributed Systems Platforms (Middleware), Nov. 2001.
Stoica et al., "Chord: a scalable peer-to-peer lookup service for internet application,"ACM SIGCOMM '01, Aug. 2001, pp. 149-160.
Tang et al., "Underlay aware design of overlay topologies and routing algorithms," Michigan State University Technical Report No. MSU-CSE-04-09, Feb. 2004.
Woo et al., "Taming the underlying challenges of reliable multihop routing in sensor networks," ACM Embedded Networked Sensor systems, Nov. 2003, pp. 4-27.
Zhao et al., "Tapestry: an infrastructure for fault-tolerant wide area location and routing," Technical Report UCB/CSD-01-1141, U.C. Berkeley, Apr. 2001.
Guangyu Pei, et al., "LANMAR: Landmark Routing for Large Scale Wireless Ad Hoc Networks with Group Mobility," IEEE 2000.
Shree Marthy, et al., "An Efficient Routing Protocol for Wireless Networks", J.C. Baltzer AG, Science Publishers, Mobile Networks and Applications 1 (1996) 183-197.
Nakao, et al., "A Routing Underlay for Overlay Networks," SIGCOMM'03, Aug. 25-29, 2003, Karlsruhe, Germany.
Karp, et al., "GPSR: Greedy Perimeter Stateless Routing for Wireless Networks," MobiCom 2000.
Hu, et al., "Exploiting the Synergy between Peer-to-Peer and Mobile Ad Hoc Networks," USENIX Association, $9^{th}$ Workshop on Hot Topics in Operating Systems, 2003.
Hill, et al., "Mica: A Wireless Platform for Deeply Embedded Networks," IEEE 2002.
Bryan Ford, "Unmanaged Internet Protocol: Taming the Edge Network Management Crisis,", Nov. 2003.
Haas, et al. "The Zone Routing Protocol (ZRP) for Ad Hoc networks," http://www.ietf.org/proceedings/02nov/I-D/draft-ietf-manet-zone-zrp-04.txt, Jul. 2002.
Moskowitz, et al., "Host Identity Protocol", http://www.tml.hut.fi/~par/HIP/draft-moskowitz-hip-08.html, Apr. 2004.
Park, et al., "Temporally-Ordered Routing Algorithm (TORA) Version 1 Function Specification", http://www.ietf.org/proceedings/02mar/I-D/draft-ietf-manet-tora-spec-04.txt, Jul. 2001.

* cited by examiner

| First Destination Node 502 | Second Destination Node 504 | First Path Segment Indicator 506 | Second Path Segment Indicator 508 | Path Indicator 510 | State Indicator 512 |
|---|---|---|---|---|---|
| 8F1 | 8F6 | 35F | 0 | 03 | |
| 8E2 | 8F6 | F01 | 0 | 2F | |
| 8F6 | 37A | 0 | 7E2 | 1E | |
| 910 | 8F6 | F01 | 0 | 2F | |
| 35F | 37A | 37A | 35F | 12 | |
| A01 | A10 | F01 | FC1 | F0 | |
| 8F6 | 20E | 0 | 20E | | PENDING |
| 8F6 | 35F | 0 | F01 | | LINKED |
| 8F6 | 7E2 | 0 | 7E2 | | FAILED |
| 8F6 | 37A | 0 | FC1 | | LINKED |

*FIG. 5*

NETWORK ROUTING

CROSS-REFERENCE TO RELATED APPLICATION

This application claims the benefit of U.S. Provisional Patent Application Ser. No. 60/602,770, filed Aug. 19, 2004, which is incorporated herein by reference.

SUMMARY

The following presents a simplified summary of the disclosure in order to provide a basic understanding to the reader. This summary is not an extensive overview of the disclosure and it does not identify key or critical elements of the invention or delineate the scope of the invention. Its sole purpose is to present some concepts disclosed herein in a simplified form as a prelude to the more detailed description that is presented later.

Structured peer-to-peer overlays have been developed with low stretch and overheads that increase with the logarithm of the number of nodes in the system. However, overlay networks typically rely on an underlying network layer transport such as Internet protocol ("IP") to provide connectivity through the network topology between overlay nodes. Thus, to reduce this dependency, a virtual ring routing architecture may be formed that leverages the design of the overlay network to achieve their desirable scaling and robustness properties but also reduce the dependency on any underlay network to setup and maintain connectivity. More particularly, the virtual ring routing architecture may be formed such that the nodes of the network are associated in a virtual ring. More particularly, each node may have a single, fixed, location independent node identifier, which may be used to organize the nodes into a virtual ring. The node identifier for each node indicates the virtual position of the node in the virtual ring such that the virtual neighbor nodes of a node in the ring are the nodes whose node identifiers are closest to the left and/or to the right of the node's node identifier.

In contrast to typical peer-to-peer networks, the connectivity between nodes through the actual network topology may be formed by a plurality of nodes in the virtual ring by maintaining connectivity to those nodes identified as virtual neighbor nodes within the virtual ring. The path through the network topology between two virtual neighbor nodes may be made up of one or path segments through one or more intermediate routing nodes. The path segments defining communication connections between virtual neighbor nodes may be used to route messages between any pair of nodes in the network and may reduce route discovery overhead, reduce delay in transmission, and reduce or eliminate flooding to setup or maintain the path segments. In this manner, the virtual ring routing architecture may maintain the desirable scaling properties of a structured overlay without reliance on IP transport. In some cases, overhead and stretch may increase with the logarithm of the number of nodes in the system, these performance metrics may remain stable, and the system may maintain consistency under churn.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 5 is a table of an example routing data store of a node of the virtual ring of FIG. 3;

Like reference numerals are used to designate like parts in the accompanying drawings.

DETAILED DESCRIPTION

Exemplary Operating Environment

Figure 1:
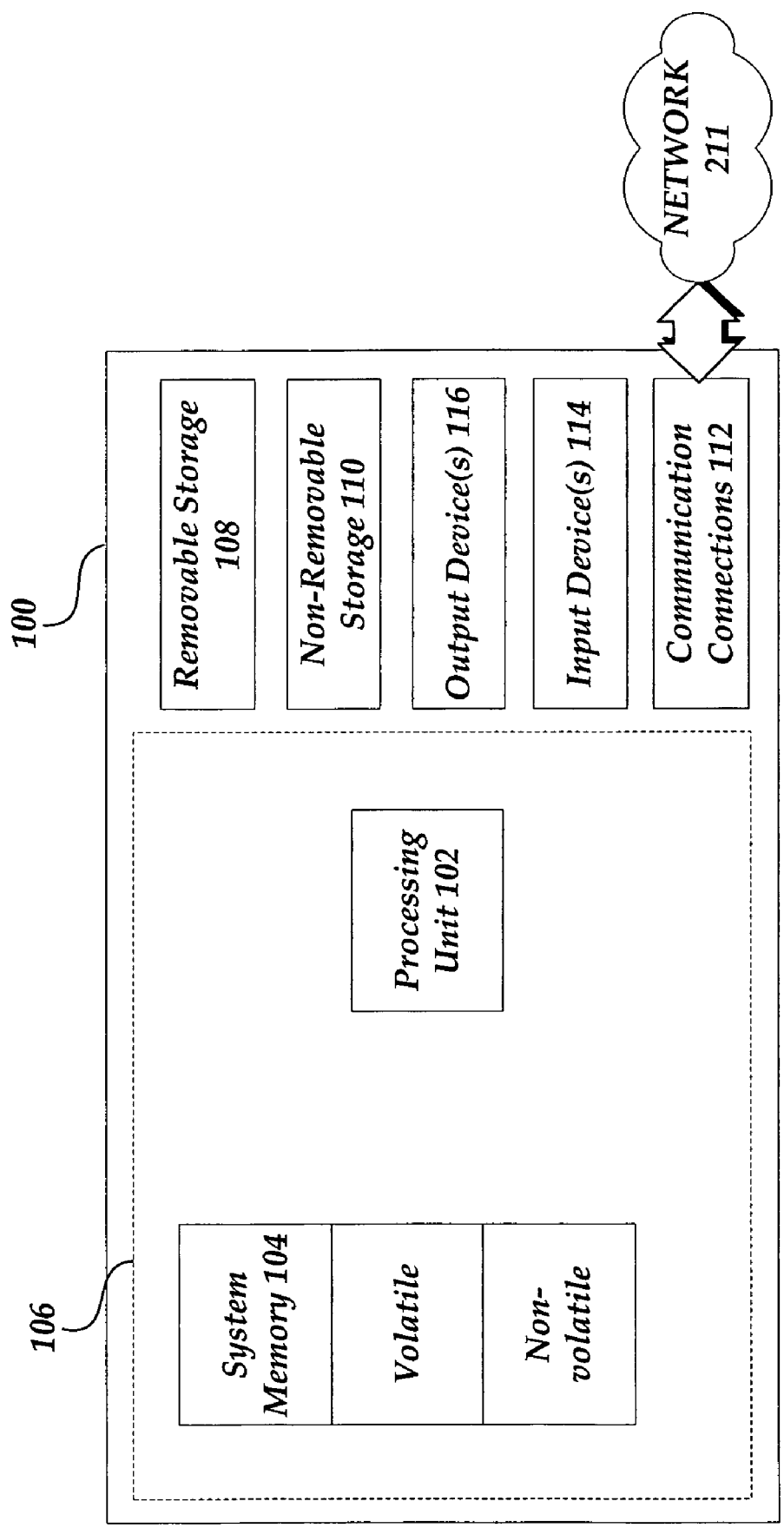
FIG. 1 is a is a schematic diagram of an example computing system for implementing a node of a virtual ring routing architecture.

FIG. 1 and the following discussion are intended to provide a brief, general description of a suitable computing environment in which all or a portion of a routing node of the virtual ring routing architecture may be implemented. The operating environment of FIG. 1 is only one example of a suitable operating environment and is not intended to suggest any limitation as to the scope of use or functionality of the operating environment. Other well known computing systems, devices, environments, and/or configurations that may be suitable for use as a virtual ring routing architecture described herein include, but are not limited to, personal computers, hand-held or laptop devices, multiprocessor systems, microprocessor based systems, programmable consumer electronics, cellular phones, network personal computers, server computers, mini computers, mainframe computers, distributed computing environments that include any of the above systems or devices, and the like.

Although not required, the virtual ring routing architecture system including the routing node will be described in the general context of computer-executable instructions, such as program modules, being executed by one or more computers or other devices.

It should be understood that the functionality that is described herein with respect to a particular module might be carried out by the module itself, by the module in cooperation with the node in which the module is included or associated, or by a number of sub-modules. For example, in some implementations, the operations performed by a module are implemented as computer-executable instructions that are embodied in one or more computer-readable media. In these implementations, the operations of the module may be executed by a processor or processors in the node in which the module is included or associated. In other implementations, the operations of a module may be implemented as hardware, firmware, or some combination of hardware, firmware, and software, either as a part of, or in some other way associated with, the node in which the module is included or associated. Furthermore, the functionality that is described herein with respect to a particular module might be carried out by, or distributed across, a number of nodes.

With reference to FIG. 1, an exemplary virtual ring routing architecture includes a computing device, such as computing device 100, as one of a plurality nodes within the network. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110.

Computer storage media includes volatile and non-volatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may contain communication connection(s) 112 that allow the device 100 to communicate with other computing devices, such as other nodes within the network 211. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 100 may also have input device(s) 114 such as keyboard, mouse, pen, voice input device, touch input device, laser range finder, infra-red cameras, video input devices, and/or any other input device. Output device(s) 116 such as display, speakers, printer, and/or any other output device may also be included.

In the description that follows, the virtual ring routing architecture is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. While the following description is described in the foregoing context, it is not meant to be limiting as those of skill in the art will appreciate that various of the acts and operations described hereinafter may also be implemented in hardware. For example, by utilizing conventional techniques known to those skilled in the art that all, or a portion of the software instructions may be carried out by a dedicated circuit, such as a digital signal processor, programmable logic array, or the like.

The data structures where data are maintained are physical locations of the memory, e.g., data stores, that have particular properties defined by the format of the data. Those skilled in the art will realize that storage devices utilized to store information such as data structures and/or program instructions can be distributed across a network. For example, a remote computing device may store an example of the process described as software. A local or terminal computing device may access the remote computing device and download a part or all of the software to run the program. Alternatively, the local computing device may download pieces of the software as needed, or distributively process by executing some software instructions at the local terminal and some at the remote computing device (or computer network).

An example of a networked environment in which a virtual ring routing architecture may be used is described with reference to FIG. 2. The example network includes several computing devices or nodes 210 communicating with one another over a network 211, represented by a cloud. Network 211 may include many well-known components, such as routers, gateways, hubs, and the like and allows the nodes 210 to communicate via wired and/or wireless media. When interacting with one another over the network 211, one or more of the nodes may act as clients, network servers, or peers with respect to other nodes. Accordingly, the various examples of the virtual ring routing architecture may be practiced on clients, network servers, peers, or combinations thereof, even though specific examples contained herein do not refer to all of these types of computing devices.

Virtual Ring

As noted above, a virtual ring routing architecture may be formed such that the nodes of the network are associated in a virtual ring. More particularly, the nodes of the network may be organized into a virtual ring based on the node identifier for each node in the ring network.

Figure 2:
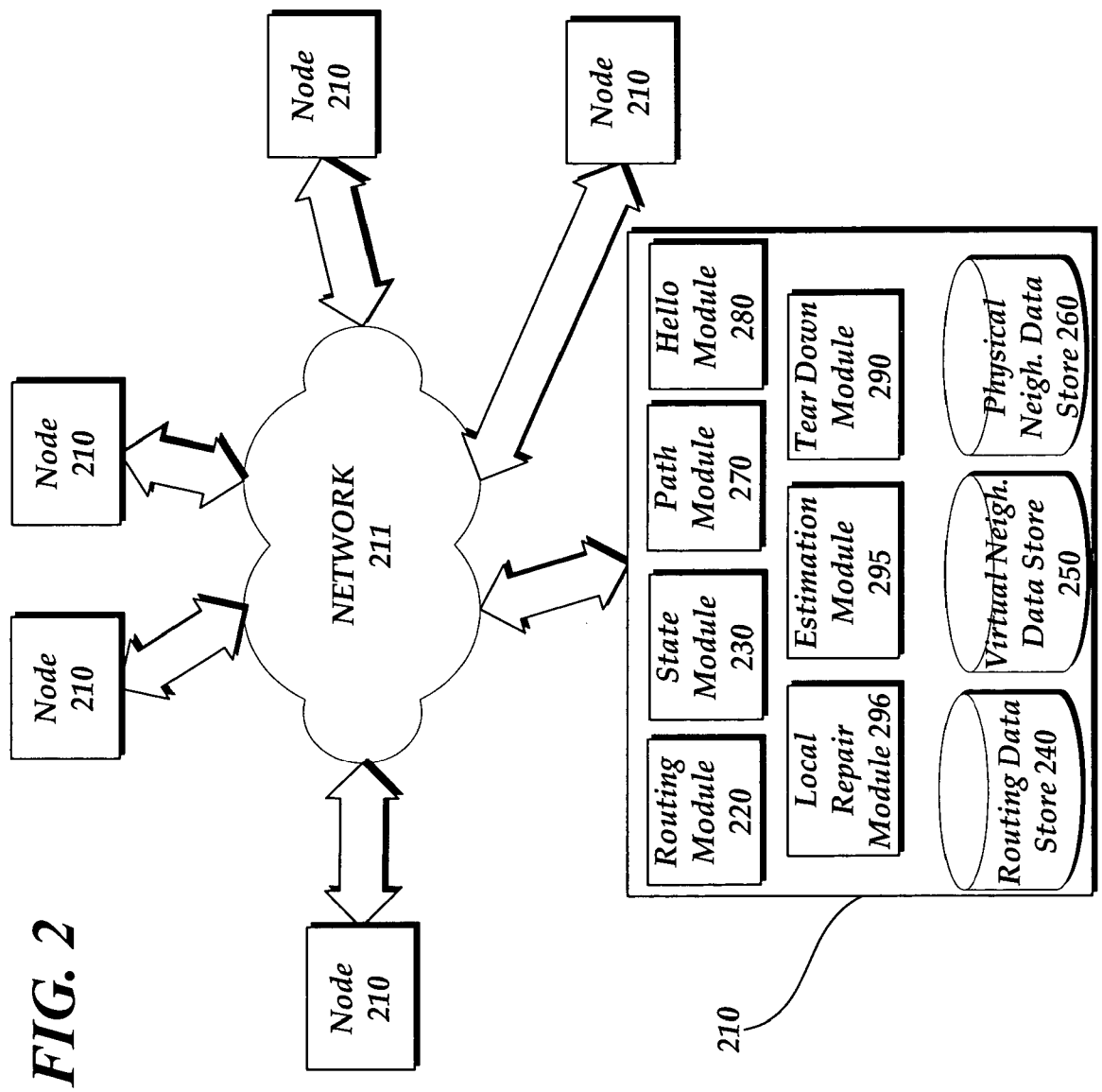
FIG. 2 is a schematic diagram of an example computing network of a plurality of nodes of a virtual ring routing architecture.

With reference to the network of nodes of FIG. 2, each node 210 in the network may have a node identifier which is fixed, and location independent. A fixed node identifier means that the node identifier for a particular node is static over time, unless that node re-registers itself with another node identifier. A location independent node identifier means that the node identifier is the same for that node, even if the node is physically located in a different location, e.g., movement to another coverage cell in a mobile or wireless network, at a different coordinate, relocated near another landmark, and the like. The node identifier for each node may also be unique, which means that each node identifier is different from every other node identifier in the network. Moreover, the node may have a single node identifier, as opposed to having a node identifier which is location independent and having a node identifier which is not location independent.

The node identifier may be any suitable fixed, location independent identifier having a length of k-bits. For example, the node identifier may be a 180 bit SHA-1 hash of a node's public key to facilitate secure communication. In another example, the node identifier may be a randomly selected 32-bit integer to provide backwards compatibility with IPv4 addresses. The node identifier may be certified, e.g., assigned by a certification authority, which may reduce Sybil attacks, and the like.

As noted above, the node identifiers may be used to organize the nodes into a virtual ring. Node identifiers are interpreted as unsigned integers and nodes are placed in the ring in order of increasing node identifiers with wrapping around zero. The immediate virtual neighbors of a node with an identifier x are the two active nodes with node identifiers closest to the node identifier x when traversing the ring clockwise and counter clockwise.

Virtual Neighbors

Figure 3:
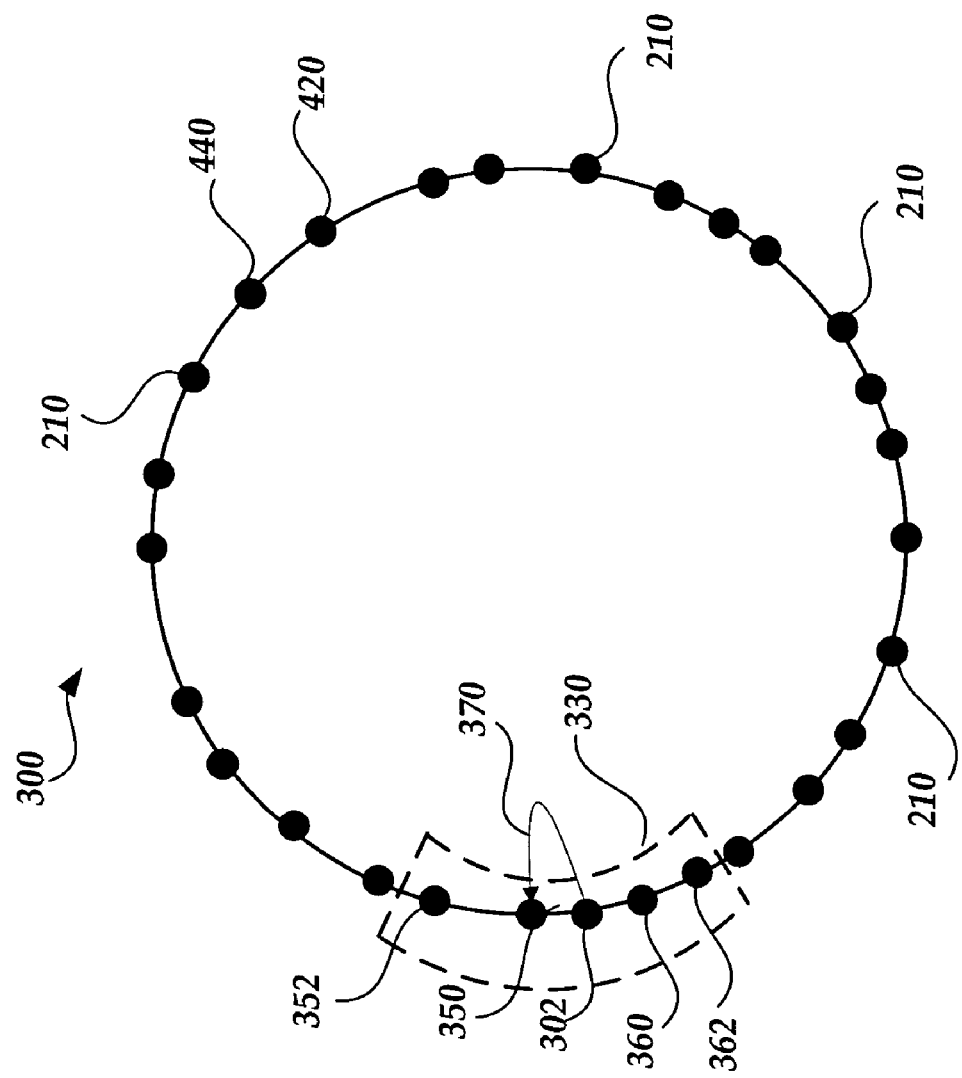
FIG. 3 is a schematic diagram of a virtual ring including a plurality of nodes.

An example virtual ring of the network nodes 210 of FIG. 2 is illustrated in FIG. 3. The virtual ring network 300 includes a plurality of nodes, each having a single, fixed, location independent node identifier. A portion of the nodes of the ring 300 are indicated with reference numeral 210. The immediate neighbors of node 302 include node 350 and node 360. More particularly, node 302 may have a node identifier of 8F6, and the immediate neighbor nodes 350, 360 may have node identifiers 90E and 8F0 respectively.

To maintain the integrity of the ring, despite node failures, link failures, and/or exit of nodes from the network, each node of the virtual ring may maintain a virtual neighbor set which contains the node identifier for each virtual neighbor node. A virtual neighbor node may be any node having a node identifier determined to be similar to that of the node identifier hosting the virtual neighbor data store, e.g., neighbors within the virtual ring defined by the node identifier namespace. More particularly, a virtual neighbor node is a neighbor of a node based on the proximity of their respective node identifiers in the virtual ring, as opposed to their proximity in the underlying physical network. For example, a virtual neighbor node may include one or more of the immediate neighbors of the node. Additionally or alternatively, a virtual neighbor node may be within a predetermined number of nodes in either or both directions around the ring from the node. For example, with reference to FIG. 3, the virtual neighbor nodes may be nodes 350, 352 which are the two nodes clockwise from the node. In another example, the virtual neighbor nodes may include nodes in both directions, and may include nodes 350, 352 and nodes 360, 362. It is to be appreciated that any suitable number of nodes in either direction relative to the node may be used. Additionally or alternatively, a virtual neighbor node may include nodes in either or both directions which have node identifiers within a predetermined distance from the node's node identifier in the node identifier name space. More particularly, a node may have any number of nodes as virtual neighbors depending on the difference between the node identifier values. For example, node 350 of FIG. 3 may be considered a virtual neighbor of node 302 if its node identifier is within a predetermined range of the node identifier of node 302. The node identifiers for those nodes identified within the virtual neighbor set may be stored in a virtual neighbor data store.

Figure 13:
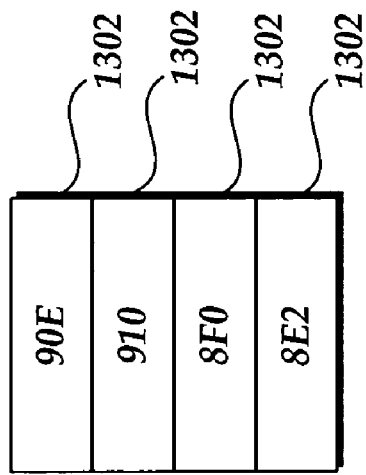
FIG. 13 is a table of an example virtual neighbor data store.

A virtual neighbor data store 250 is shown schematically in FIG. 2. An example virtual neighbor data store 1300 for node 302 of FIG. 3. is illustrated in FIG. 13. The virtual neighbor data store 1300 may include the node identifier(s) 1302 of any virtual neighbor nodes of the node 302, which is the host of the virtual neighbor data store 1300. The node identifiers 1302 may be listed in any particular order which may depend on the direction around the virtual ring, the virtual distance from the node to the virtual neighbor, the physical distance to the virtual neighbor, the link quality to the virtual neighbor, stability or length of time within the virtual neighbor node set, and the like.

The number of virtual neighbor nodes on either side of a node in the virtual neighbor set may be symmetrical or asymmetrical. In a symmetrical virtual neighbor set, the virtual neighbor set may be defined as the r/2 closest virtual neighbors clockwise in the ring from the node, and the r/2 closest neighbors counter-clockwise in the ring from the node. For example, as shown in FIG. 3, node 302 may have virtual neighbors 350, 352, 360, 362 as shown by the virtual neighbor set 330, which is symmetrical around node 302 with a value of r=4. It is to be appreciated that any suitable value of r may be used.

Membership in a virtual neighbor set may be symmetrical or asymmetrical between virtual neighbor nodes. More particularly, if a first node is in a second node's virtual neighbor set, then the second node is within the virtual neighbor set of the first node if membership is symmetrical. If membership is not symmetrical, a first node may or may not be in a second node's virtual neighbor set, even if the second node is within the first node's virtual neighbor set. In the examples below, membership is assumed to be symmetrical, although it is to be appreciated that one of skill in the art may modify the architecture to accommodate asymmetrical virtual neighbor sets.

Physical Neighbor Nodes

To route messages between nodes, the virtual ring routing architecture may proactively maintain routing paths through the network topology between a node and each member of its virtual neighbor set. If the membership in virtual neighbor sets is symmetrical, then the routing paths between a node and its virtual neighbors are bi-directional. The routing paths through the network topology may be set up and maintained in any suitable manner. For example, each node may use any combination of techniques including those similar to that used in Destination-Sequenced Distance Vector (DSDV) or in Ad-Hoc On-Demand Distance Vector (AODV) routing to determine its physical neighbor nodes with which the node may have communication links. The node identifiers for physical neighbor nodes discovered by the node may be stored in a physical neighbor data store.

Figure 14:
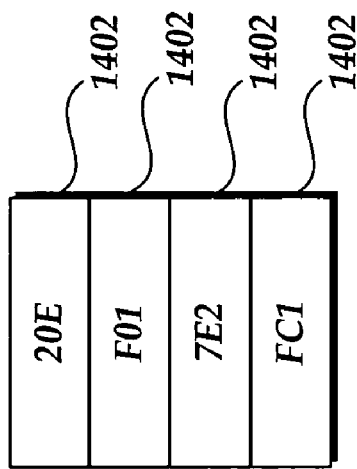
FIG. 14 is a table of an example physical neighbor data store.

An example physical neighbor data store 260 is shown schematically in FIG. 2. An example physical neighbor data store 1400 for node 302 of FIG. 3 is illustrated in FIG. 14. The physical neighbor data store 1400 may include the node identifier(s) 1402 of any physical neighbor nodes of the node 302, which is the node hosting the physical neighbor data store. The node identifiers 1402 may be listed in any particular order which may depend on the path distance form the node, the estimated delay for the path segment between the physical neighbor nodes, the virtual distance from the node to the physical neighbor, the physical distance to the physical neighbor, the link quality to the physical neighbor, stability or length of time within the physical neighbor node set, and the like.

The virtual neighbor data store and the physical neighbor store may be stored in any suitable manner and in any suitable format. Any suitable indicator may be used to identify the nodes in either the virtual neighbor data store and/or the physical neighbor data store. However, as discussed below, the nodes may be identified by the node identifiers within the virtual ring routing architecture.

Routing Data Store

Figure 4:
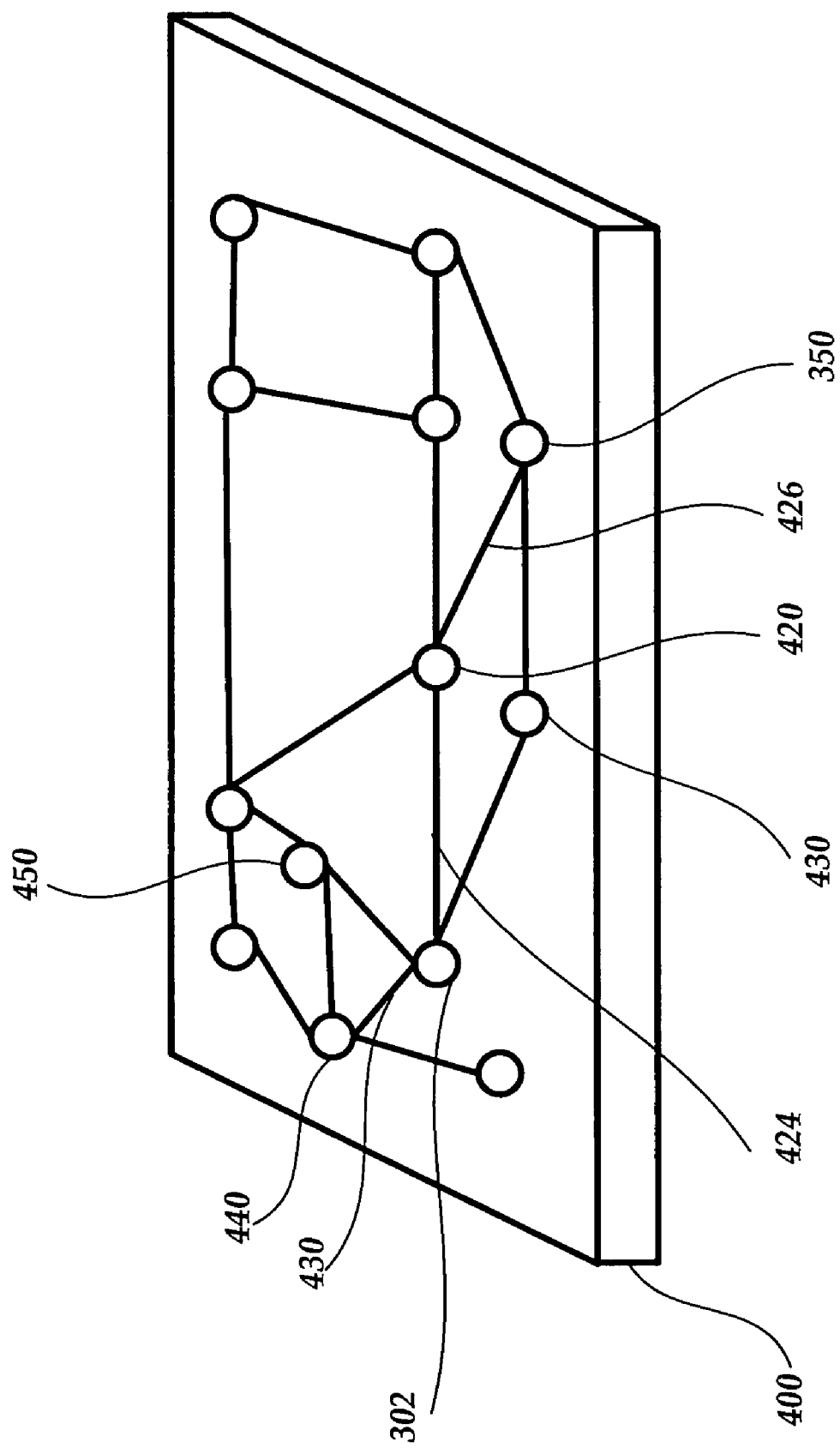
FIG. 4 is a schematic diagram of a network topology for the virtual ring of FIG. 3.

Since node identifiers are location independent, the virtual neighbors of a node will typically be distributed substantially randomly across the physical network topology. Accordingly, the routing paths between a node and its virtual neighbors may be multi-segmented in many cases, e.g., comprising one or more path segments defined by the endpoint destination nodes and any intermediate nodes along the path. More particularly, the path through the network topology from a node to one of its virtual neighbors may include one or more path segments through zero or more other nodes of the network topology. For example with reference to FIG. 3, the hop 370 through the node identifier name space from node 302 to node 350 may be routed over a path through the physical connections of the network topology with one or more path segments. FIG. 4 illustrates an example network topology 400 associated with the virtual ring 300 of FIG. 3. The hop 370 from node 302 to node 350 may be viewed in the network topology 400 as a path including path segment 424 from node 320 to node 420, and path segment 426 from node 420 to node 350.

To maintain the routes between a node and its virtual neighbors, each node may maintain a routing data store which associates the node identifier for the virtual neighbor node with information about the path in the network topology. A node may also help maintain zero or more paths through the network topology which are routed through itself as an intermediate node.

For example, with reference to FIG. 4, node 420 is an intermediate node in the path from node 302 to node 350 and may help generate and/or maintain that path. The routing data store may associate any suitable path identifier with the information about the path. For example, the path identifier may indicate the node identifier for the destination and/or originating node, an indicator for a particular path, and the like. The routing data store may associate with either the path identifier and/or the node identifier any other suitable data including, for example, a path cost indicator such as a hop or path segment counter, a proxy node identifier, a last underlay hop indicator, and the like. A routing data store 240 is shown schematically in FIG. 2.

It is to be appreciated that any suitable data store in any suitable format may be used to store and/or communicate the virtual neighbor data store, the physical neighbor data store, the routing data store, and the like, including a relational database, object-oriented database, unstructured database, an in-memory database, or other data store. A storage array may be constructed using a flat file system such as ASCII text, a binary file, data transmitted across a communication network, or any other file system. Notwithstanding these possible implementations of the foregoing data stores, the term data store and storage array as used herein refer to any data that is collected and stored in any manner accessible by a computing device.

The routing data store may associate a destination node identifier with a next path segment identifier. More particularly, the destination node identifier may be the node identifier for a node which may be an end point or intermediate node for a message to be routed. More particularly, the destination node identifier may be a node identifier from the node's virtual neighbor set, from the node's physical neighbor set, or from other nodes having a network topology path through the node hosting the routing data store. The next path segment identifier may indicate the next path segment in the network topology to a physical neighbor node which is in the path through the network topology which is towards the node identified by the destination identifier. The next path segment identifier may indicate a particular path segment in any suitable manner, including, an indicator of the particular path segment in the network topology, the node identifier of the intermediate node defining the other endpoint of the path segment, and the like.

FIG. 5 illustrates an example routing data store 500 for node 302 of FIGS. 3 and 4. Accordingly, as shown in FIG. 5, the routing data store 500 associates a first destination node identifier 502 with a first path segment identifier 506. More particularly, the destination node identifier 502 may indicate a virtual neighbor node (e.g., nodes 350, 352, 360, 362) and associate a particular path segment from node 302 to a physical neighbor node which is in the path in the network topology towards the virtual neighbor node. For example, node 302 includes node 350 as a virtual neighbor node. Thus, the routing data store 500 includes a record 520 which associates the node identifier for node 350 with a destination node identifier 522. The routing data store 500 associates the destination node identifier 522 with the next path segment identifier 526 which indicates the path segment from node 302 to node 420, which with reference to FIG. 4, is path segment 424. As shown in FIG. 5, the path segment identifier may be the node identifier for the other endpoint node defining the path segment, e.g., path segment identifier 526 indicates the node identifier of node 420.

Additionally and/or alternatively, the routing data store may indicate the next path segments to the nodes identified in the physical neighbor set. In this manner, the next path segment indicated is the path to the physical neighbor node, since there can be no intervening nodes with physical neighbor nodes. For example with reference to the network topology of FIG. 4, node 440 is a physical neighbor of node 302. Accordingly, the routing data store 500 of FIG. 5 may indicate the path segment between the physical neighbor nodes 302, 440. More particularly, a record 540 may indicate an association between a destination node identifier 544 indicating node 440 with a path segment identifier 548 indicating the path segment 430 of FIG. 4 from node 302 to node 440.

The routing data store may also indicate the second destination node identifier which may indicate the other endpoint destination node of the path. In the case of a virtual neighbor node, the second destination node is the node identifier for the node hosting the routing data store, e.g., node 302 in FIG. 5. Since there is no path segment from the node to itself, its associated second path segment identifier may be null or contain any suitable value which indicates that the associated destination node is the host node. For example, with reference to the routing data store 500 of FIG. 5, second destination identifier 524 in record 520 may indicate the node 302 and the associated second path segment identifier 528 may indicate a null value.

In the case of a physical neighbor node, the second destination node is the node hosting the routing data store. Similar to the virtual neighbor case, there is no path segment from the node to itself. Accordingly, the second path segment identifier may be null or contain any suitable value. For example, with respect to the routing data store 500 of FIG. 5, the destination node identifier 542 may indicate node 302 and the associated path segment identifier 546 may indicate a null value.

As noted above, the node hosting the routing data store (e.g., node 302) may be an intermediate node in a path through the network topology between two other endpoint nodes. Accordingly, the routing data store may associate the identifier of an endpoint node in a path through the network topology with the path segment identifier which is included in the path with one path segment endpoint being the node that hosts the routing data store. However, the node identifier of the endpoint node will not be within the virtual neighbor set and/or the physical neighbor set of the node hosting the routing data store.

For example with reference to the virtual ring 300 of FIG. 3 and the associated network topology of FIG. 4, node 302 may be an intermediate node between virtual neighbor nodes 420 and 440, i.e., nodes 420, 440 are virtual neighbor nodes with respect to each other based on their node identifiers in the node identifier name space. Thus, the routing data store 500 of FIG. 5 may associate a path segment identifier 536 which indicates path segment 424 of FIG. 4 with destination node identifier 532 which indicates node 420.

Moreover, as noted above, membership in a virtual neighbor set may be symmetrical, and thus, the path between the virtual neighbor nodes may be bi-directional, e.g., messages may be routed through the same intermediate node from a first node to a second node, and from the second node to the first node. Additionally, the protocol for maintaining physical neighbor sets described later may ensure that membership in a physical neighbor set is symmetrical. The routing data store may store the symmetric routes in any suitable manner, such as in the same record and/or associated records. More particularly with reference to FIGS. 3 and 4, node 302 may be an intermediate node in a path in the network topology between neighbor nodes 420 and 440. Thus, the routing data store 500 of FIG. 5 may associate a path segment identifier 538 indicating path segment 430 of FIG. 4 with destination node identifier 534 indicating node 440, which may be in the same record (such as record 530) with a path segment identifier 536 indicating path segment 424 of FIG. 4 with destination node identifier 532 indicating node 420.

The routing data store may include any other information appropriate to the routing between nodes in the network. For example, the routing data store may include information indicating a path identifier, a specific node responsible for setting up the path between the two destination end-points, a segment count indicator, a proxy node identifier, identifiers of other nodes along the path, a metric indicating the quality or cost of the path, and the like. The segment count indicator may indicate the number of path segments and/or number of intermediate nodes in the complete path between two nodes; or may indicate the number of path segments and/or number of intermediate nodes from the originating node to the node hosting the routing data store. The proxy node identifier may indicate that a message on a path defined by the two destination nodes may also be delivered (e.g., routed) to a proxy node before delivery to the indicated destination node.

In one example, the routing data store 500 of FIG. 5 illustrates a path identifier 510 which may identify the path through the network topology between the indicted destination nodes. In some cases, only those paths which pass through intermediate nodes (e.g., those destination nodes which are not physical neighbor nodes) may include a path identifier, such as shown in FIG. 5. The path identifier may be any suitable identifier of the path, such as a label, a numerical indicator, a hash of the two destination nodes defining the path, and the like. Any suitable entity may define the path identifier, such as a certification authority, the node setting up the path, and the like. Each defined path between two endpoint nodes may be uniquely identified. However, the identification of a path may include a combination of one or more of the path identifier, the node identifier of one or both endpoint nodes, and the like. In this manner, the path identifier does not need to be distinct (as shown in FIG. 5). For example, the path identifier may be assigned by the node setting up the path, e.g., the node identified by the first destination node identifier 502, which may be the node which initiates the path set up. Each path may be uniquely identified by the pair of the destination node identifier 502 and the path identifier 510. The value of a path identifier may be small, since each node is likely to originate only one path to each of its virtual neighbor nodes, and a node can reuse the identifiers of torn down paths after a probation period to ensure that there are no routing data store entries with those path identifiers.

Additionally or alternatively, the routing data store may indicate which destination node is responsible for path set up and/or maintenance. Any suitable indicator may be used to indicate the responsible destination node, including a responsible party indicator in a data field associated with the path identifier and/or path segment identifier, placement of the node identifier of the responsible node as the value of the first or second destination node, and the like. For example, as shown in the routing data store 500 of FIG. 5, the first destination node 502 may indicate the node responsible for setting up and/or maintaining the path segment identified by the path segment identifier 506, and/or path segment identifier 508. More particularly, node 350 as indicated by destination node 522 may be responsible for setting up the path between node 350 and node 302, the path in the network topology comprising path segments 424, 426 of FIG. 4.

Routing

To route messages based on the routing data store entries, each routing node may include a routing module which implements a routing algorithm determining how to route generated and/or received message. Routing module 220 is shown schematically in FIG. 2. Any suitable routing algorithm may be used as appropriate.

Figure 6:
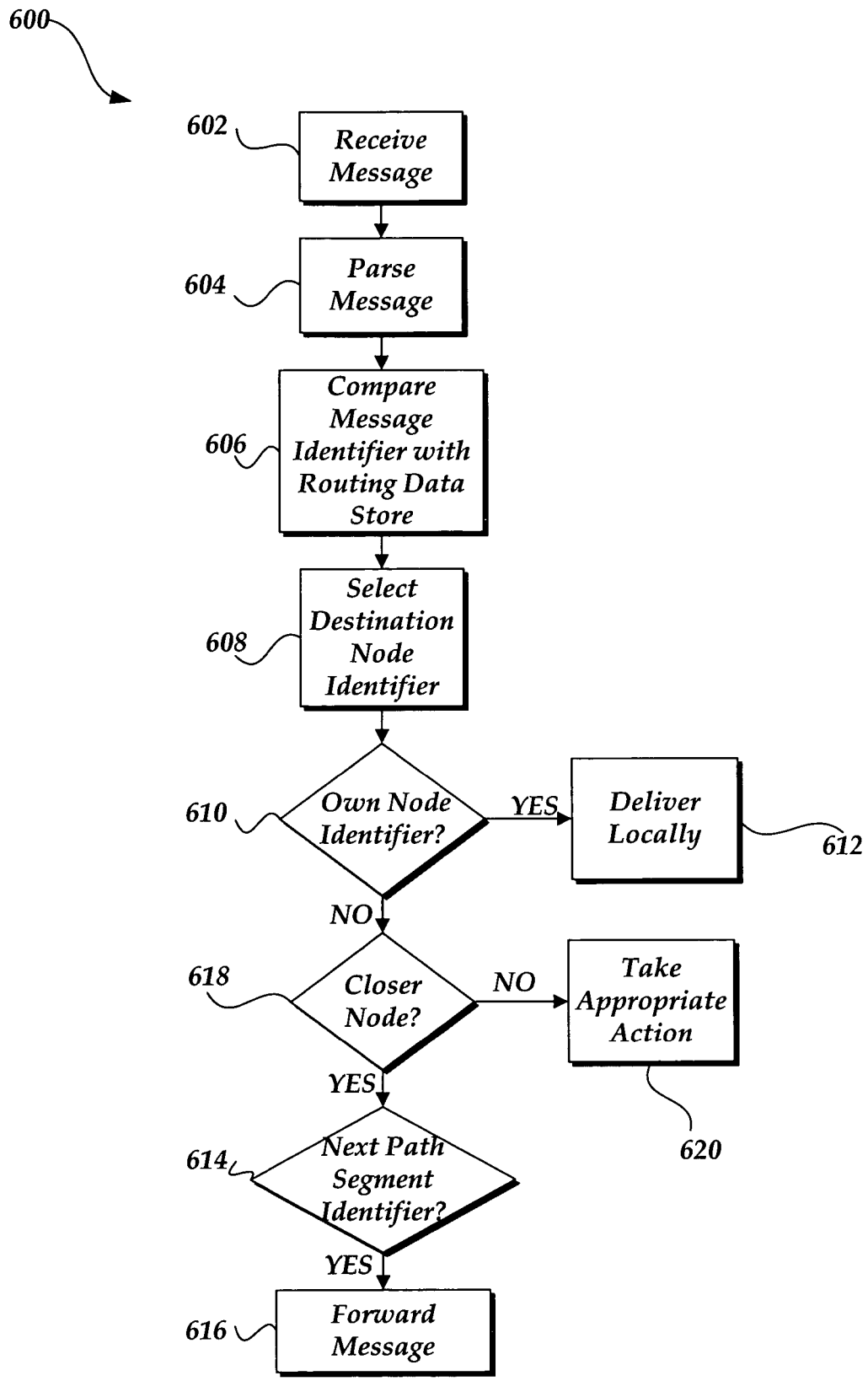
FIG. 6 is a flow chart of an example method for routing.

In one example, the routing module may determine the node with a node identifier closest to the message identifier (which is the identifier of the destination node for the message) based on the entries in the routing data store and forward the message towards that node. For example, with reference to the routing method shown in FIG. 6, a message may be received 602, such as through a network connection and/or generated by the node. The node may parse 604 the message to determine the message identifier which indicates the destination of the message which may be the node identifier for the destination node of the message. The routing module may compare 606 the message identifier with the destination node identifiers indicated in the routing data store. Based on the comparison, the destination identifier from the routing data store having the closest node identifier to the message identifier may be selected 608. The selected node identifier may be compared 610 to the node identifier of the receiving node. If the closest node identifier is the node identifier for the receiving node, then the message may be delivered 612 locally. If the selected node identifier is different than the node identifier for the receiving node, the routing data store may be examined to determine 614 the next path segment identifier associated with the selected destination node identifier. The message may be forwarded 616 over the identified path segment to the next node. The next node may then use its routing module to determine if the message is to be delivered locally or forwarded over the next path segment toward the destination node indicated by the message identifier.

In some cases, the routing data store may contain a plurality of alternative path segment identifiers for an identified destination node identifier. In this manner, determining 614 of the method 600 of FIG. 6 the next path segment identifier for a selected destination node may include selecting an associated path segment identifier from a plurality of path segment identifiers. Any suitable technique or algorithm may be used to determine the appropriate path segment selection, such as associated path cost (which may be approximated by a hop count indicator), a value (such as the lowest value) of the pair of the destination node identifier 502 and the path identifier 506, and the like. The selection process may be generated to reduce loops in messages through the network topology before reaching the destination node.

Routing Path Set Up

As noted above, a node may determine a routing path to each node in its physical neighbor set locally because it can communicate directly with these nodes. Additional paths may be set up and maintained within the network topology to facilitate routing such as through the virtual ring. For example, nodes may setup paths to their virtual ring neighbors.

Path set up in the virtual ring routing architecture may be set up without flooding the network. For example, a set up node may set up a path to a destination node by routing a path set up message to the destination node. The path set up message may be routed using the routing modules of each routing node in the path to the destination node based on the routing algorithm described above.

Figure 7:
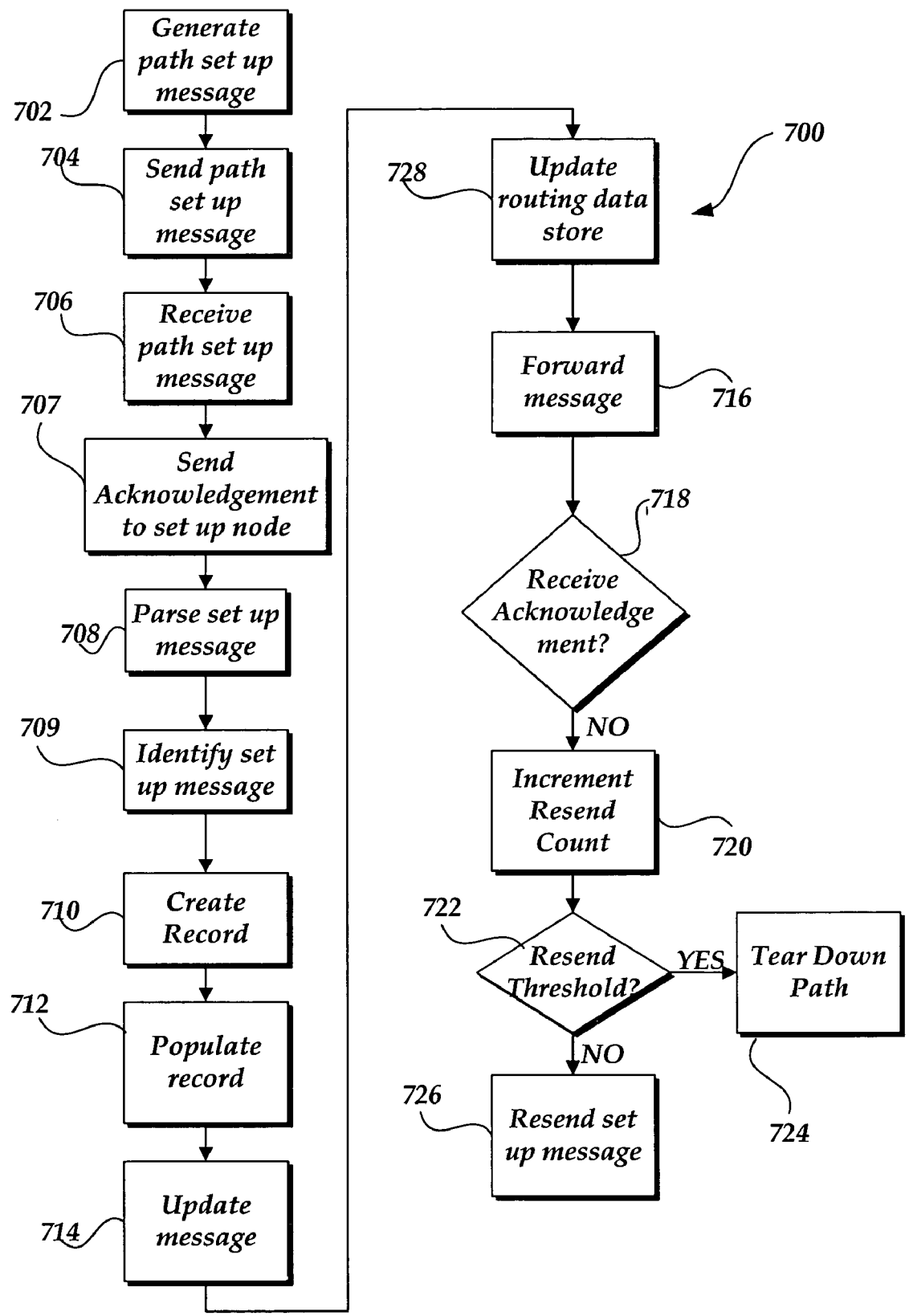
FIG. 7 is a flow chart of an example method for setting up a path between two nodes.
Figure 15:
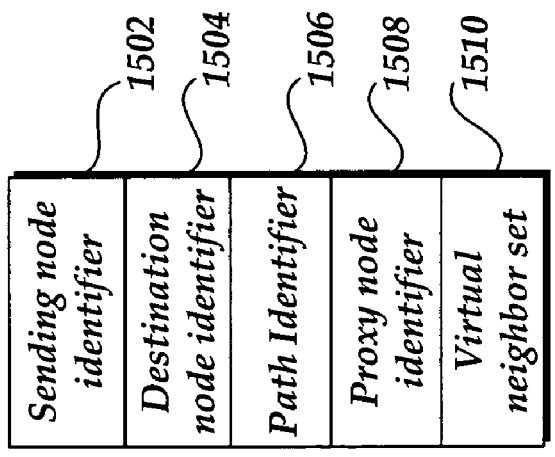
FIG. 15 is a schematic diagram of an example path set up message in accordance with the method of FIG. 7.

With reference to the example method 700 of path set up illustrated in FIG. 7, the set up node may generate 702 the path set up message. An example path set up message 1500 is shown in FIG. 15. The path set up message may include one or more of the node identifier for the sending node 1502 (i.e., the node setting up the path and/or the immediately previous intermediate node), the node identifier for the desired destination node 1504 (e.g., message identifier or message key), a path identifier 1506, an optional proxy node identifier 1508, the one or more node identifiers 1510 of the virtual neighbor nodes of the set up node, and any other suitable identifier and/or indicator of information appropriate to routing and/or path set up. The path set up message may be in any suitable format in accordance with any suitable message protocol. As noted above, the path identifier may be generated by the set up node in any suitable manner, such as from a set of available path identifiers not currently in use by the set up node. The proxy node identifier may indicate a particular, desired intermediate node in the path between the set up node and the desired destination ode. In this manner, the proxy node may act as a limited form of source routing. More particularly, if the proxy node identifier field is not null, then the path may be set up between the set up node and the destination node through the node identified by the proxy node identifier. Using a proxy node identifier to set up a specific path may increase path diversity such as by selecting proxy nodes that are physical neighbors of the destination node. The one or more virtual neighbor nodes indicated in the set up message may be used to increase virtual ring consistency, which will be discussed further below. The set up node sends 704 the path set up message to the physical neighbor determined using the routing procedure in FIG. 6.

To set up the path, a receiving node may receive 706 the path set up message from the originating set up node, and it may parse 708 the path set up message to determine the destination node identifier of the path set up message. The processing of the path set up message may be accomplished by the receiving node's path module 270 which is shown in FIG. 2. With respect to FIG. 7, the receiving node may identify 709 the message as a path set up message. Accordingly, the receiving node may create 710 a new record in its routing data store. Using the information parsed from the set up message, the receiving node may populate 712 the record. For example, with reference to the example routing data store 500 of FIG. 5, the receiving node may associate the set up node identifier with the first destination node 502. The second destination node 504 of the routing data store may be populated with the destination node identified in the set up message. The first path segment identifier 506 may be populated with a path segment identifier indicating the path segment used to deliver the path set up message to the receiving node (e.g., the immediately previous node sending the message to the receiving node). The second path segment identifier 508 may be populated with the path segment identifier (e.g., the immediately next node in the path) determined using the routing algorithm of the routing module of the receiving node discussed above. The populated record may then be added to the routing data store.

The receiving node may update 714 the path set up message. For example, the proxy identifier may be updated, and the like. For example, the receiving node may compare its node identifier to the proxy node identifier. If the proxy node identifier is the same as the receiving node's node identifier, then the receiving node may update the proxy node identifier field to null or to another suitable proxy node identifier. The receiving node may update 728 its routing data store.

The receiving node may then forward 716 the path set up message over the indicated path segment identifier, such as to its physical neighbor node which has a node identifier closest to the indicated destination node. In some cases, the set up message may indicate a proxy node identifier which is an indication of a 'forced' intermediate node in the path from the set up node to the destination node. However, the routing algorithm implemented in the routing module of one or more routing nodes may short circuit a proxy node identifier in certain cases. For example, if the indicated destination node in the set up message is a physical neighbor node of the receiving node, the receiving node may forward the message directly to the destination node, rather than through the indicated proxy node. However, it is to be appreciated that this may be optional and/or may be implemented in any appropriate predetermined case, e.g., known traffic congestion, node and/or network outages, and the like.

The receiving node may wait 718 for an acknowledgement of the forwarded message from the indicated physical neighbor node. In one example, the virtual ring routing architecture may take advantage of Media Access Control (MAC) layer acknowledgements and retransmissions when available, however, it is to be appreciated that any acknowledgement and/or retransmission technique may be used. In one example, if an acknowledgement message is not received from the physical neighbor node within a predetermined amount of time, the receiving node may increment 720 a resend count indicator and compare 722 the resend count indicator with a predetermined resend threshold. If the resend threshold is not exceeded, the receiving node may resend 726 the path set up message to the physical neighbor node indicated by the path segment identifier. If the resend threshold is exceeded, then the receiving node may tear down 724 the path segment to the physical neighbor node, as will be discussed further below.

In a similar manner, the receiving node may send 707 its own acknowledgement message to the immediately previous node in the path in response to receiving the path set up message. The immediately previous node may similarly wait for acknowledgment and retransmit as necessary and/or tear down the path.

As noted above with respect to the routing algorithm, the message routing ends when the path set up message reaches a node whose identifier is the closest to the destination node identifier indicated in the message (e.g., the message identifier). In many cases the closest node identifier is identical to the indicated destination node identifier. However, if there is no node with a node identifier equal to the destination node identifier or is not reachable, the message may be delivered to any other appropriate node or may take any other suitable action, such as tearing down the path. More particularly, in populating 712 the record, the receiving node may implement the routing method of FIG. 6 and select 608 a destination node identifier from its routing data store which is closer to the destination node identifier of the path set up message. If a destination node identifier can be selected from the routing data store, the receiving node may proceed with comparing 610 the selected node identifier with its own node identifier. If no other node with a closer node identifier can be selected 618 from the routing data store, then the receiving node may take 620 any appropriate action. For example, the receiving node may hold the path set up message for a predetermined period of time and may verify from time to time that there is no other node with a closer node identifier than itself. In some cases, the receiving node may send a message to the set up node indicating itself as the proper destination node. Additionally and/or alternatively, the receiving node may initiate a path tear down, as will be discussed further below.

In some cases, a receiving node may detect that a loop exists in the path being set up. For example, in creating the record 710, the receiving node may verify that a record does not already exist for that set up node identifier and path identifier, and the like (e.g., a unique identification of a path). If the record already exists in the receiving node's routing data store, the receiving node may take any appropriate action, such a path tear down, notifying the set up node of path loop, and the like.

Symmetric Failure Detection

As noted above, routing paths through the network topology may be setup and maintained between all or a portion of virtual ring neighbors and/or physical neighbors. The paths may be maintained in any suitable manner such as proactively and/or passively. Moreover, paths may fail due to many factors including any combination of persistent link failure, node failure, or node exit from the network, and the like. The path failure may be detected in any suitable manner, including end-to-end probes, heartbeats, local mechanisms, and the like. Local mechanisms may be proactive and may increase symmetric failure detection to maintain routing state consistency across nodes.

As noted above, each routing node, which in the example herein is all nodes participating in the network, may monitor the health of the nodes included in its physical neighbor set. Each routing node may check the health of its physical neighbor nodes in any suitable manner and at any suitable time. For example, a routing node may, from time to time, check the health of its physical neighbor nodes by broadcasting a hello message or any other suitable message, which may be similar to those used in AODV. Generation and sending hello messages may be implemented in any suitable manner, such as by a hello module 280 shown in FIG. 2. In one example, a routing node may send a hello message to each of its physical neighbor nodes every t seconds. In this manner, the physical neighbor set of a routing node may the list of nodes from which it has received a hello message in the last 2 kt seconds. The parameters k and t may be set in any suitable manner as appropriate for the network.

In one example, the hello period of t may be chosen from the range 1 to 15 seconds and the number of missed hello messages before a node is marked Failed (discussed further below) may be approximately k=4. In this manner, the physical neighbor node set may include those nodes sending a hello message within the last 2 kt=approximately between 8 and 120 seconds. When a packet or message is forwarded to a node and no acknowledgement is received, a number of retransmissions may occur before the node is considered dead. The packet may be dropped or may be forwarded to another node. The number of retransmissions can be any suitable value, such as 5. The timeout for packet retransmission may start at any suitable value, such as approximately 10 milliseconds which may be increased over time, such as with exponential back off.

The nodes in the physical neighbor set may each be associated with a state indictor indicating the state of the physical neighbor node. Any suitable state may be used. For example, a physical neighbor node may have one of the states of linked, pending, or failed. A physical neighbor which is marked as Linked means that physical neighbor is thought to be alive and that the link is symmetric. The link being symmetric means that messages sent by the node are received by the physical neighbor and messages sent by the physical neighbor are received by the node. A physical neighbor that is marked as Failed means that the node believes that other node has failed. This may be because the physical node has really failed, or did not acknowledge a message or the hello messages have not been received in the last kt seconds. The Pending state means that the node is receiving messages from the physical neighbor but the node does not know if the link is a symmetrical link.

A physical neighbor data store may store the node identifier for each physical neighbor node and its associated state. However, since the associated physical neighbor node identifiers are also stored within the routing data store, the associated state for each physical neighbor node may be additionally or alternatively stored in the routing data store. It is to be appreciated, that if a node is indicated as Failed, then that node may not be used during the routing process.

Figure 16:
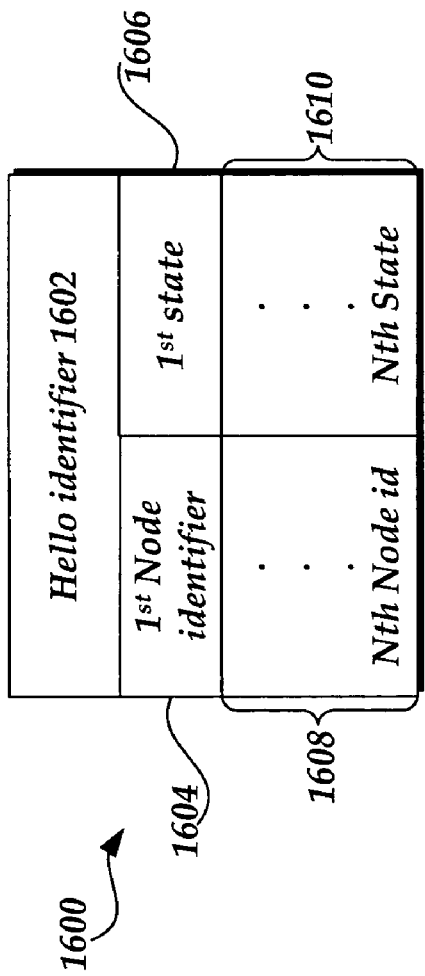
FIG. 16 is a schematic diagram of an example hello message in accordance with the method of FIG. 8.

A routing node may include in each hello message a list of each of its physical neighbor nodes and the associated state for each physical neighbor node. An example hello message 1600 is shown in FIG. 16. The hello message 1600 may include a hello message indicator 1602, a first node identifier 1604 of a first physical neighbor node. The hello message 1600 may associate the first node identifier 1604 with a first data indicator 1606. A portion of or all physical neighbor node identifier 1608 of the sending node may be associate their respective state indicators 1610. It is to be appreciated that the hello message may be in any suitable format in accordance with any suitable protocol, and may include any other information or parameters as appropriate for the application.

When a node receives a hello message, the receiving node may determine its own state indicated in the hello message. Based at least in part on its own indicated state from the hello message and the state of the sending node indicated in its own routing data store, the receiving node may update the state of the sending node, such as by updating the routing data store accordingly. The state of the sending node may be updated in any suitable manner, such as by using a state transition matrix and/or state transition graph implemented by a state module, such as state module 230 of FIG. 2.

Figure 9:
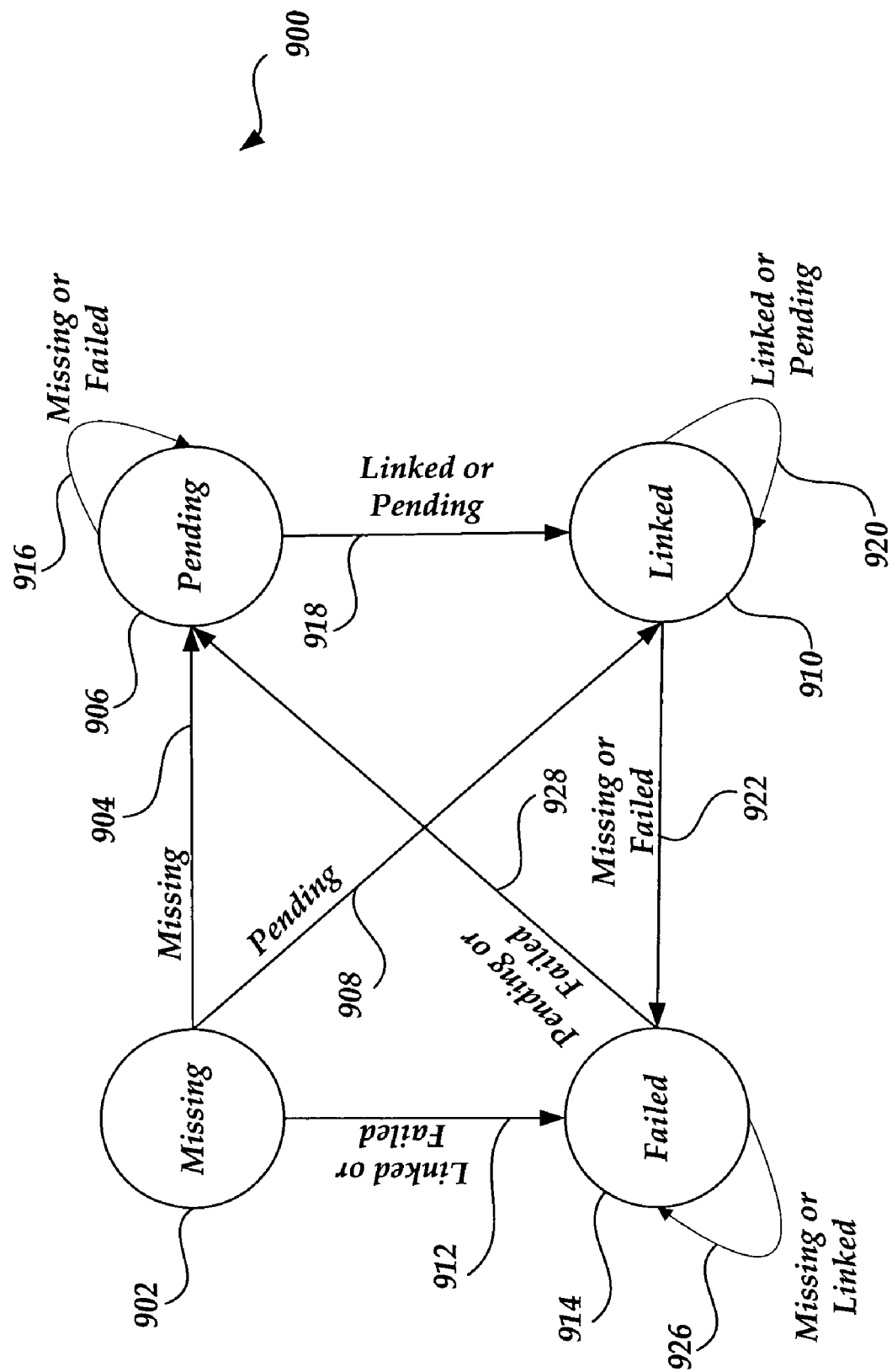
FIG. 9 is a schematic diagram of an example state transition matrix.

An example state transition graph is illustrated in FIG. 9. For example, the state of the sending node indicated in the routing data store may have an Missing state 902. The Missing state means that either the receiving node does not know about the sending node, or the sending node has not included an entry in the hello message for the receiving node. Thus, the Missing state is not a state that is associated with a node in a data store, but more an indication of a lack of state or lack of knowledge.

If the state of the receiving node as indicated in the hello message is also an Missing state (e.g., the node identifier for the receiving node is not included in the hello message), then the sending node state indicated in the routing data store may be updated to a Pending state 906. If the state of the receiving node from the hello message is listed as a Pending state 908, then the (Missing) state 902 of the sending node may be generated in the routing data store to indicate a Linked sate 910. If the state of the receiving node as indicated in the hello message is Linked or Failed 912, then the Missing state 902 of the sending node may be generated in the routing data store to indicate Failed 914. The state of the sending node indicated in the routing data store may be Pending 906. If the state of the receiving node is indicated in the hello message as Missing or Failed 916, then the Pending state 906 of the sending node may be maintained in the routing data store as Pending 906. However, if the state of the receiving node as indicated in the hello message is Linked or Pending 918, then the routing data store may be updated to change the Pending state 906 of the sending node to Linked 910. The state of the sending node as indicated in the routing data store may be Linked 910. If the state of the receiving node as indicated in the hello message is Linked or Pending 920, then the routing data store may be maintained with the sending node in the Linked state 910. However, if the receiving node has a Missing or Failed state 922, then the routing data store may be updated to change the Pending state 920 to a Failed state 914. The state of the sending node as indicated in the routing data store may be Failed 914. If the hello message indicates that the state of the receiving node is Missing or Linked 926, then the Failed state 914 of the sending node may be maintained in the routing data store. However, if the receiving node has a Pending or Failed state indication in the hello message, then the routing data store may be updated to change the Failed state 914 of the sending node to a Pending state 906. More particularly, to ensure that no paths are left 'dangling', the state transition graph may ensure that if a node A thinks node B is Failed, then the state transition graph may ensure that node B will also think node A has Failed. Thus, if node B thinks it is Linked, then node A may keep node B as Failed to ensure that node B eventually marks node A as Failed. Once node A has seen that node B has marked node A as either Failed or Pending, then node A knows that all paths between node A and node B have been torn down, and can move through Pending to Linked. It is to be appreciated that in an alternative state transition graph, the if the hello message indicates that the state of the receiving node is Missing, then the Failed state 914 of the sending node may be updated to a Pending state 906.

The state transition graph of FIG. 9 is one example of the number, type, and changes of states which may be indicated in the routing data store. It is to be appreciated that any number, type, and/or changes to state may be used as appropriate.

The state of a node identifier indicated in the routing data store may be modified and/or updated using alternative and/or additional factors which may be implemented in any suitable manner, such as by the state module 230 of FIG. 2. For example, if the receiving node does not receive a hello message from the sending node for a predetermined first period of time, the receiving node may update the state of the sending node to Failed. The first predetermined period of time may be any suitable period of time, which may depend on the value of kt seconds. Additionally or alternatively, the receiving node may remove the sending node from its physical neighbor set (and consequently, from its routing data store and/or physical neighbor data store) if it does not receive a hello message for a second predetermined period of time. The predetermined second period of time may be any suitable period of time, such as 2 kt seconds. Using a combination of the state transition graph of FIG. 9 and the additional state updates may increase the likelihood that a node can send and receive messages from nodes in the linked state. Moreover, the state transition graph may enforce the symmetry of the failure detection, e.g., if a receiving node marks a sending node as failed in its data store, then the sending node may be ensured that it marks the receiving node at Failed within its own state indicator, such as in the routing data store.

The state transition graph of the receiving node may be implemented in any suitable manner. For example, a state transition graph of a state module may be implemented in a state machine, an associative memory, a hash table, or in any other suitable manner in hardware and/or software.

A routing node may enter a node identifier of a physical neighbor node into its physical neighbor set in any appropriate manner and depending on any appropriate factors. Generation and/or maintenance of the physical neighbor set and their associated states may be implemented in any suitable manner, such as by the hello module 280 of FIG. 2.

For example, a routing node may only be able to receive a hello message from a node that it is a physical neighbor node. The hello message, whether or not it includes the indicated states of other neighbor nodes, indicates that the sending node is active, i.e., whether it has already joined the virtual ring network. A node may become active after it has completed the join procedure, which will be discussed further below. Thus, based on reception of a hello message, a routing node may determine if the sending node is a physical neighbor and if that node is active in the network. The routing node may enter the physical neighbor node identifier of an active node in its physical neighbor set, e.g., in the routing data store and/or the physical neighbor data store. In a further example, a routing node may include a node identifier in its routing data store only if the routing node determines that the sending node is a physical neighbor, that the physical neighbor node is linked, e.g., sending a hello message, and that the node has a Linked state, which may be indicated in the physical neighbor data store.

If the hello message includes the physical neighbor set of the sending node, the receiving node may determine the physical neighbors of the sending node. Accordingly, if the sending node is a physical neighbor node to the receiving node, the receiving node may examine the physical neighbor nodes identified in the hello message and may update the state and/or physical neighbor node set in its own routing data store in a similar manner. In one example, a node may only receive messages from physical neighbors. In this manner, if a node receives a hello message from another node, then the nodes are physical neighbors.

Moreover, if the hello message also indicates the state of the listed physical neighbor nodes of the sending node, the receiving node may determine which neighbors of the sending node which are active, and can be reached within two path segments via the sending node. These nodes which are within two path segments of the receiving node may stored in any suitable data store, such as the routing data store and/or the physical neighbor data store. The nodes within two path segments (i.e., through the sending node) may be referred to as the near physical neighbor set. Moreover, the paths to the near physical neighbor nodes may be added to the routing data store and/or physical neighbor data store with a path segment identifier indicating the path to the node sending the hello message. As noted above, the path segments associated with the near neighbor node set may trump a proxy node identifier indication in a path set up message.

If the receiving node changes the state of the node sending the hello message from a Linked state to any other state, the near physical neighbors having a path segment identifier indicating the node with a changed state may be removed and/or updated accordingly. In a similar manner, if the sending node identifier in the routing data store and/or physical neighbor data store is not associated with a Linked state, then sending node identifier may be removed from the routing data store and/or updated accordingly.

Node and link failures may additionally and/or alternatively be detected using per-segment acknowledgements and/or retransmissions for any other message, including and/or excluding the hello message. For example, all messages except hello messages may be acknowledged on each path segment transmission, and/or may be retransmitted if no acknowledgement is received within a predetermined period of time. The sending node may update the state and/or data store listing of node identifiers based on the receipt of acknowledgements and/or requirements of re-transmissions. For example, a sending node may indicate that a physical neighbor node has a state of Failed when the sending node fails to receive acknowledgements for messages sent to the physical neighbor node after a predetermined number of retransmissions of the message. The acknowledgements and/or time and destination of retransmissions may be the same as or different from that discussed above with respect to the path set up message.

Link Quality Estimation

Link quality estimation of the link between physical neighbor nodes may be associated with the path segment identifier for that path segment. Accordingly, the routing data store may associate a link quality indicator with each path segment identifier that indicates the quality of the link. The link quality indicator may be a numerical indicator such as 1 is bad and 0 is good, a text indicator such as poor/fair/good, a numerical range of link quality, or any other suitable indicator of link quality.

The quality of the link may be estimated in any suitable manner including those discussed by Aguayo et al., "Link-level measurements form an 802.11b mesh network," Conference on Application, Technologies, Architectures, and Protocols for Computer Communications, August 2004, pp. 121-132.; Woo, et al., "Taming the underlying challenges of reliable multi-hop routing in sensor networks," 1$^{st}$ Conference on Embedded networked Sensor Systems, November 2003, pp. 14-27; and Draves, et al, "Comparison of routing metrics for static multi-hop wireless networks," Conference on Application, Technologies, Architectures, and Protocols for Computer Communications, August 2004, pp. 133-144, which are all incorporated herein by reference. Link estimation may be implemented by a routing node in any suitable manner, such as by an estimation module 295 shown in FIG. 2. In one example, the quality of the link may be estimated using a Window Mean Exponentially Weighted Moving Average (WMEWMA) algorithm which is discussed further in Woo, et al.

The WMEWMA may be modified in any suitable manner. For example, a receiving node of the network may maintain information about messages sent and received from each physical neighbor over a predetermined period, e.g., a period of/seconds. In particular, the receiving node may track for a particular physical neighbor node y any combination of a count ($M_y$) of the total number of messages sent to the physical neighbor node y, a count ($R_y$) of the number of retransmission messages to the physical neighbor node y, and a count ($H_y$) of the number of the hello messages received from the physical neighbor node y. At the end of the predetermined period of time, the collected count(s) may be used to estimate the current link quality $\mu_y$, such as by using the following equation:

$$\mu_y = \frac{(M_y - R_y) + H_y}{M_y + H'_y} \quad (1)$$

where $H'_y$ is the number of hello messages from the sending node that the receiving node expected to receive. The number of expected hello messages may be based on one or more factors including the duration of time t between a hello message broadcasts, and the like. The receiving node may then compute an estimate of the link quality using EWMA as follows:

$$E_{y_{i+1}} = \alpha E_{y_i} + (1-\alpha)\mu_{y_i} \quad (2)$$

where $E_{y_i}$ is the current link quality metric for the link (path segment) between the receiving node and the sending node y, $E_{y_{i+1}}$ is the new value for the link quality metric, and $\alpha$ is a parameter used to dampen the rate of change of $E_{y_i}$. The value of $E_{y_i}$ may be initialized to any suitable value, such as 1. Any suitable value for/and $\alpha$ may be used. For example, the damping parameter $\alpha$ may be approximately 0.7, and the period of time for link evaluation may be approximately 30 seconds. In one example, the link quality may be within the range of 0 to 1, which 0 being the lowest link quality and 1 being the highest link quality. A high-low watermark scheme may be used, where a lower watermark for the link quality threshold may have a value of approximately 0.7 and an upper watermark link quality threshold may have a value of approximately 0.9.

The link quality indicator associated with a particular path segment identifier may be used in any combination of a variety of applications. For example, the link quality indicator may be used to select a single path segment for a message from a plurality of available path segment identifiers. Additionally, or alternatively, the link quality indicator may be used to remove and/or maintain path segment identifiers in the routing data store. More particularly, in one example, path segments with a link quality indicator having a link quality below a lower predetermined watermark threshold may provide a trigger for the node to remove the path segment identifier from its routing data store, to update the state of the associated node identifier to a state of Failed, or any other suitable response. Similarly, a physical neighbor node state indicator may be updated from Failed to Pending or Linked if the link quality indicator indicates a link quality above an upper predetermined watermark threshold. The lower and upper watermark thresholds for the link quality indicator may be the same or different.

Path Tear Down

A path segment may be torn down by a routing node in response to a detected link failure, a link having a quality below a predetermined threshold, a node failure, failure of consistency checks, and the like. More particularly, when a receiving node marks a sending node as having a state of Failed in its physical neighbor set, the receiving node may initiate a path segment tear down of one or more paths in its routing data store which have that sending node and/or path segment identifier as an indicated next path segment identifier and/or the next next path segment identifier (discussed further below). Path tear down may be implemented in any suitable manner, such as by a tear down module 290 shown in FIG. 2.

The path segment may be torn down in any suitable manner. For example, as shown in the example method 1800 of FIG. 18, a node may detect 1802 a failure in the network, which may be triggered by a state change, link quality, and/or removal of a node in a path as discussed above. The node may send 1804 a teardown message to one or more surviving physical neighbor nodes identifying the path or paths to be torn down. The path to be torn down may be the particular path segment, and/or any paths between virtual neighbor nodes which go through the failed node and/or traverse the failed path segment. The path to be torn down may be indicated in any suitable manner. For example, the path may be identified by the node identifiers for the end points of the path, a path identifier, and/or a path segment identifier.

In one example, if a routing node determines that a physical neighbor node has failed, the routing node may send 1804 a teardown message to a surviving physical neighbor node with the full identifier of paths that have both the failed node and with the surviving physical neighbor node as next path segment identifier in the routing data store. The tear down process may be repeated for all or a portion of the surviving physical neighbor nodes that have the failed path segment or node as a next path segment identifier or as a next next path segment identifier (discussed further below). In other cases, the tear down message relevant to a plurality of physical neighbor nodes may be combined and sent to one or more physical neighbor nodes (e.g., those physical neighbor nodes which have paths indicated in the teardown message), all physical neighbor nodes, and the like. The routing node may update 1806 its routing data store to indicate the torn down path, such as by removing those path segment identifiers from its routing data store which indicate a path segment to the failed node. It is to be appreciated that the above technique may be similarly implemented for a detected failed or low quality link, and the like.

Figure 17:
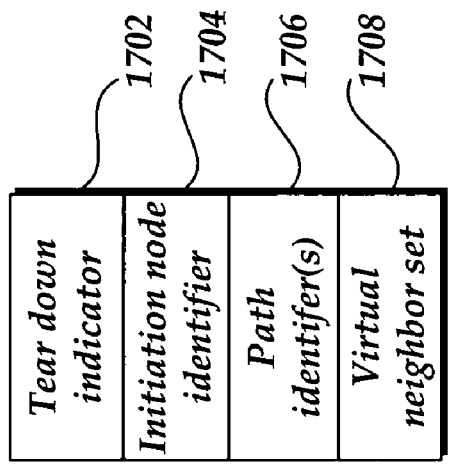
FIG. 17 is a schematic diagram of an example tear down message in accordance with the method of FIG. 18.

The teardown message may have any suitable form. For example, as shown in the example tear down message 1700 of FIG. 17, the teardown message may include any combination of a teardown indicator 1702, an initiation node identifier 1704 indicating the routing node initiating the teardown, one or more path identifiers 1706 (which as noted above may be uniquely identified by the set up node and the path identifier), and/or a virtual neighbor set indicator 1708. The virtual neighbor set indicator may indicate the virtual neighbor set of the node originating the message, which may be used as a stabilization mechanism to improve virtual ring consistency. For example, the virtual neighbor set indicator may be set to null or any other suitable value for teardown messages generated after a physical neighbor is marked failed. However, teardown messages may also be triggered in other cases, such as when a set up message is routed to the wrong node, when a node is evicted from the virtual neighbor set due to the arrival of a new (and closer) virtual neighbor node, and the like. Accordingly, in some cases (such as in mis-routing of a set up message and node eviction), the virtual neighbor set indicator may be set to contain the virtual neighbor set of the node which originates the teardown message to improve virtual ring consistency.

Figure 18:
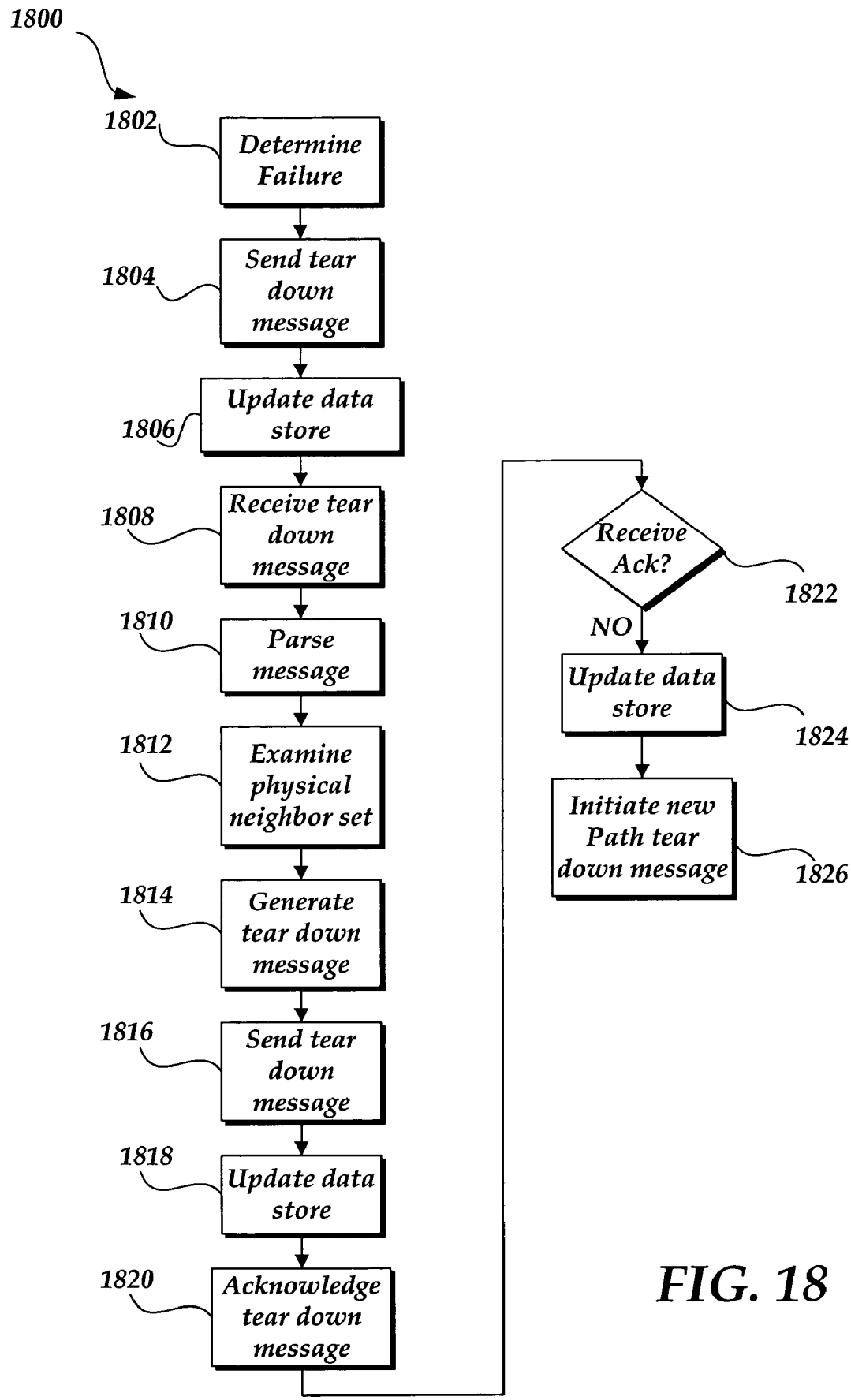
FIG. 18 is a flow chart of an example method of tearing down a path.

With respect to FIG. 18, when a surviving physical neighbor node receives 1808 the teardown message, it may process the tear down message in any suitable manner, such as with a tear down module 290 shown in FIG. 2. In response to a received tear down message, the receiving node may parse 1810 the tear down message to determine the node identifiers included in paths to be torn down. The receiving node may examine 1812 its own physical neighbor set (e.g., in the routing data store and/or physical neighbor data store) to determine the set of physical neighbor nodes other than the originating node that are indicated as next path segments in one of the paths whose identifiers are in the tear down message. The receiving node may then generate 1814 a teardown message identifying those path segments which should be torn down. The receiving node may send 1816 the second teardown message to any suitable physical neighbor nodes, such as all physical neighbor nodes, the relevant physical neighbor nodes (e.g., those affected by the path tear down), and the like. For example, the receiving node may send a second teardown message to those physical neighbor nodes which are associated with the next path segment identifier for those path(s) identified in the first teardown message. The receiving node may additionally or alternatively, update 1818 its routing data store to remove those paths which are indicated in the teardown message that have the originating node associated with the next path segment identifier. This process may continue until all paths affected by the failure are town down.

As noted above, tear down messages, like the set up path message, may be acknowledged and/or retransmitted as appropriate. Accordingly, the receiving node may acknowledge 1820 receipt of the first tear down message back to the sending node. In a similar manner, the receiving node, after sending the second tear down message, may wait 1822 for acknowledgment of its own tear down message. In some cases, failure to receive an acknowledgement from a physical neighbor node may trigger the node to update the state for the node which did not acknowledge. For example, the state may be updated 1824 to Failed in the physical neighbor set, such as in the routing data store. It is to be appreciated that this indication of node failure may initiate 1826 a new round of path tear downs which include that newly failed node. The new path tear down may improve routing state indication consistency with concurrent failures.

Figure 8:
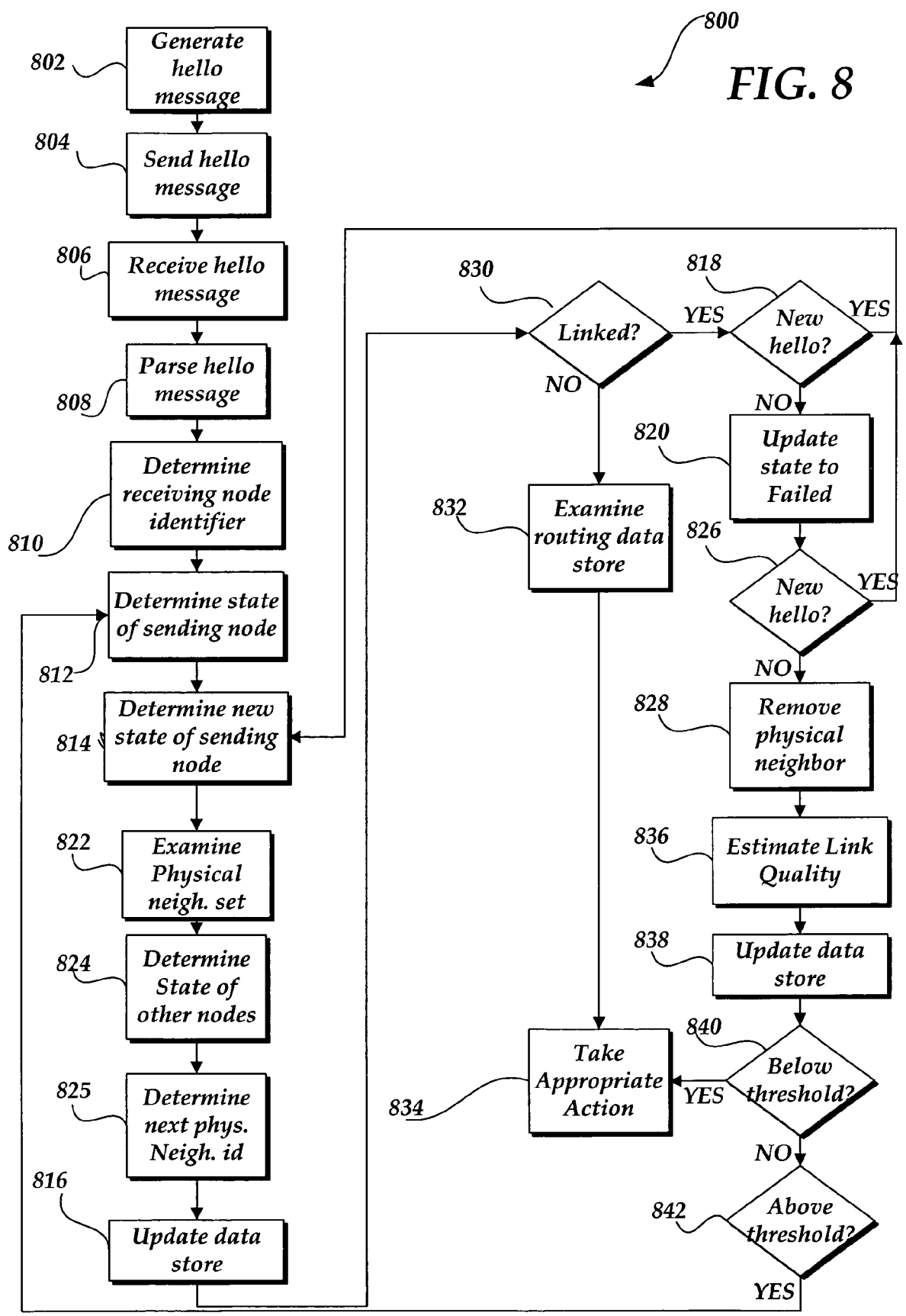
FIG. 8 is a flow chart of an example method for detecting a failure in the virtual ring routing architecture of FIG. 4

In operation, FIG. 8 illustrates an example method of link failure detection and response. A sending node may generate 802 a hello message. As noted above, the hello message may include one or more node identifiers for known physical neighbor nodes and its respective state. The sending node may send 804 the hello message to one or more of its physical neighbor nodes. As noted above, the hello message may be broadcast to all or selected physical neighbor nodes, and/or it may be individually addressed to all or selective physical neighbor nodes. A physical neighbor node may receive 806 and parse 808 the hello message to determine 810 if the hello message includes the receiving node's node identifier and its associated state. The receiving node may determine 812 the state associated with the node identifier of the sending node. For example, the receiving node may retrieve the state from its routing data store and/or physical neighbor data store based on the node identifier of the sending node, as parsed from the hello message.

Based on the indicated state of the receiving node from the hello message and the indicated state of the sending node from the data store, the receiving node may determine a new state of the sending node in the appropriate data store. As noted above, the state of the sending node could determine this using a state transition graph or other transition factors. The receiving node may examine 822 the state of other node identifiers listed in the physical neighbor set of the sending node. If these nodes are included in the routing data store and/or physical neighbor data store, the receiving node may determine 824 a new state for those node(s) as well. The receiving node may determine 825 a near physical neighbor node by examining the list of physical neighbor nodes in the hello message. The new state of the sending node and/or other listed nodes and near physical neighbor nodes may be updated 816 in the appropriate data store such as the routing data store and/or the physical neighbor data store. In one example, near physical neighbors may have their state indicated by the mere inclusion in the routing table. More particularly, a near physical neighbor node may be included in the routing table, and the inclusion in the routing table indicates that the near physical neighbor node has a state of Linked. As discussed further below, one way of detecting that a node is failed is by not receiving a hello massage from the node in a predetermined period of time. It is to be appreciated that any suitable manner of detecting a failed node or link may be used.

If the new state of the sending node and/or the indicated state of the receiving node is indicated 830 as not Linked (e.g., Failed, Pending, Unknown/Missing), the receiving node may examine 832 the routing data store for the Failed nodes as a next path segment identifier, and may take 834 appropriate action. Appropriate action may include removing the path with the non-Linked stated, updating the routing data store, commencing path tear down, repairing the link (discussed further below), and the like.

The receiving node may wait 818 a predetermined period of time for another hello message from the sending node (or acknowledgement from the next receiving node). If the hello message (or acknowledgment) is received, then the receiving node may return to determining 814 a new state of the sending node (or next receiving node if acknowledgement). If no hello message (or acknowledgement) is received (and the retransmission process of routing has been accomplished), the receiving node may update 820 the state of the sending node to Failed. The receiving node may wait 826 a second period of time for a hello message (or acknowledgment) from the sending node (or next receiving node if acknowledgment). It is to be appreciated that while waiting for a hello message (or acknowledgement), the receiving node is also sending hello messages. In one example, the hello messages sent by the receiving node may indicate the node as Failed or Pending during the wait period. If a hello message (or acknowledgment) is received, the receiving node may return to determining 814 a new state of the sending node. If no hello (or acknowledgement) message is received, the receiving node may remove 828 the sending node from its physical neighbor set, such as by removing the node from its physical neighbor data store and/or removing the node from its routing data store.

The receiving node may estimate 836 the quality of the link with the sending node. As noted above, the link quality may be estimated in any suitable manner. The link quality may be associated with the path segment identifier and may be updated 838 in any appropriate data store such as the routing data store and/or the physical neighbor data store. The link quality may be compared 840 to a lower bound threshold. If the link quality is below the lower bound, threshold, the receiving node may take 834 appropriate action. Appropriate action may include removing the paths using the poor quality link, updating the routing data store, commencing path tear down, repairing the link (discussed further below), and the like. If the link quality is above the lower bound threshold, the link quality may be compared 842 with an upper bound threshold. If the link quality is above the upper bound threshold, the receiving node may determine 812 a new state for the sending node. For example, as noted above, a Failed state may be updated to Pending or Linked if the link quality is above the upper bound threshold.

Local Path Repair

As an alternative to tearing down the full path that includes a failed link or node, a path segment may be repaired locally in any suitable manner. For example, a failed path segment or node may be replaced by one or more alternative path segments, if possible. One example of locally repairing a failed path segment is described further in Johnson, et al., "Dynamic source routing in ad hoc wireless networks," Ad Hoc Networking, 2001, chapter 5, pp. 139-172, Addison-Wesley, which is incorporated herein by reference. Alternatively, a local repair may be accomplished by determining a replacement path involving path segments which include only those nodes around the failed link (e.g., the physical neighbor nodes of the failed link). Since, in some cases, no end-to-end path information is maintained, such as hop or segment counts to the endpoints, a path may be updated locally without communicating the repair (e.g., path segment changes) to the end points of the path and/or along the length of the path. In this manner, the cost of repair may be constant rather than increasing with path length.

To determine a replacement path which includes only those nodes around the failed link, the state stored in the routing data store may be extended for each path segment. More particularly, when setting up a path between two end-point nodes of the path, each intermediate routing node in the path between the end-point nodes may associate with a destination node identifier not only a next path segment identifier, but also a next next path segment identifier. For example, as noted above, the next path segment identifier, such as the next node in the path, indicates the next path segment for a message to be routed to the associated destination node identifier. In a similar manner, the next next path segment identifier may indicate the path segment that the message may travel in the next leg towards the destination node. The next next path segment identifier may be indicated and/or stored in any suitable manner. For example, as shown in the example routing data store 500 FIG. 5, a next next path identifier field 512 may be associated with the appropriate destination node identifier in the routing data store. In a manner similar to that of the next path segment identifier, the next next path segment indicator may have a first next next path segment indicator 512 associated with the first destination node, and may have a second next next path segment indicator 514 associated with the second destination node.

The next next path indicator may be communicated to a routing node in any suitable manner. For example, a path set up message may include a previous path segment identifier which indicates the previous path segment traversed by the path set up message. More particularly, an appropriate field in the set up message may indicate the node identifier of the intermediate (or originating set up node) which processed the message immediately prior to the sending node.

Figure 19:
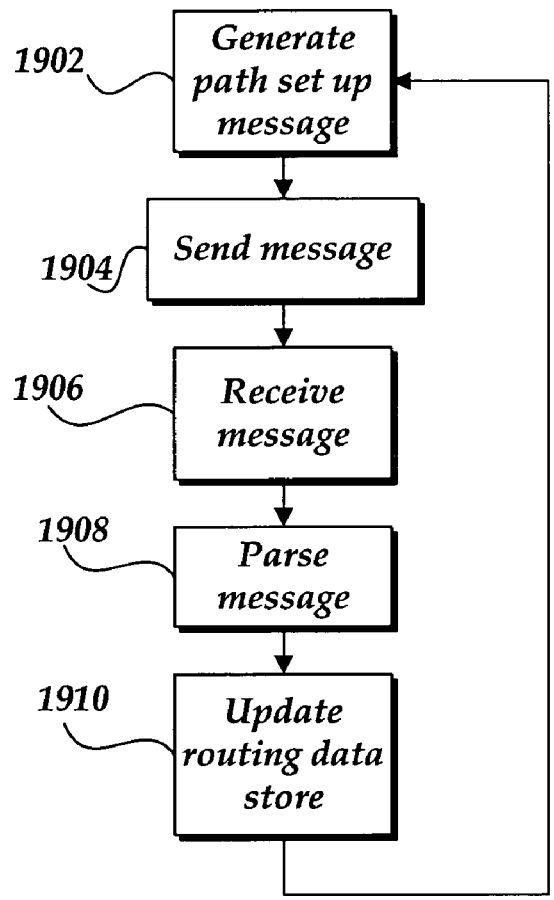
FIG. 19 is a flow chart of an example method of determining a next next path segment indicator.

FIG. 19 illustrates an example method 1900 of determining a next next path segment. A node may generate 1902 a path set up message, in a manner as discussed above with reference to FIG. 7. The path set up message may include the set up node's node identifier in the sending node identifier field, and the previous path segment identifier field may be null. The node may send 1904 the path set up message, which may be received 1906 by a second node. The second node may parse 1908 the message, and may update 1920 the routing data store such as by storing the sending node identifier from the message as the next path segment indicator associated with the destination node identifier indicating the set up node of the message (e.g., the source node). The set up message may also include the node identifier for the node from which the sending node received the setup message. In this manner, the receiving node may update the next next path segment indicator with the node identifier of the node sending the message to the sending node, and may associate the next next path segment indicator with the destination node identifier indicating the set up node of the message. The receiving node may generate 1902 the path set up message (which may include modifying the existing path set up message) with its own node identifier in the sending node identifier field and move the prior sending node identifier field value to the previous path segment identifier field of the message. The next intermediate node may receive 1906 the message. However, when updating 1910 the routing data store, the prior path segment identifier may also be stored as the next next path segment identifier associated with the destination node identifier of the node originating the path set up message. The receiving node may then generate 1902 the path set up message for routing to the next intermediate segment by updating the prior path segment identifier with the path segment identifier indicating the path segment through which the message was received, e.g., the node identifier of the sending node. In a similar manner, the receiving node may update the sender node identifier (or intermediate node identifier) in the message with its own node identifier, and so on until the path set up message reaches its intended recipient. In this manner, the path set up message may include not only the node identifier of the sending node, but also the node identifier of the previously sending node.

Figure 10:
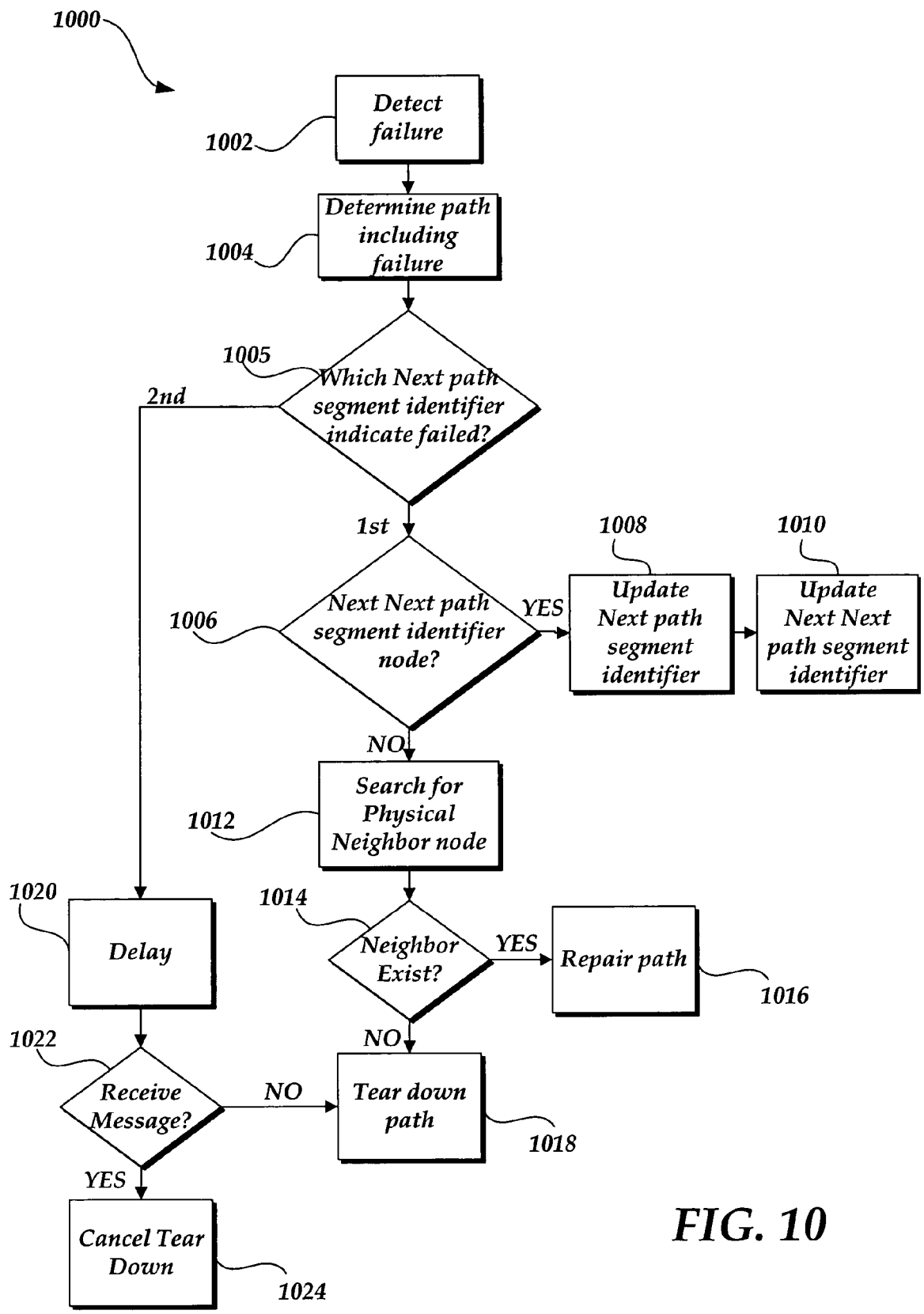
FIG. 10 is a flow chart of an example method for locally repairing a failed path.

FIG. 10 illustrates a method of locally repairing a torn down link. The local repair may be implemented in any suitable manner, such as by a local repair module 296 shown in FIG. 2. A routing node may detect 1002 a physical neighbor node or link failure in any suitable manner, such as those described above with reference to FIG. 8. In response to the detected failure, the routing node may determine 1004 the one or more paths in its routing data store which use the failed link as a next path segment identifier. For example, the routing node may examine the first and second path segment identifiers for a reference to the failed path segment.

If the associated first path segment identifier of a record references 1005 the failed path segment, the routing node may check 1006 if the associated next next path segment identifier indicates a node which is a member of its physical neighbor node set. If so, then the routing node may use that physical neighbor node as the next path segment. For example, the routing node may update 1008 the next path indicator of the failed path segment to the value of the next next path indicator. Additionally, the next next path indicator may be updated 1010 to any appropriate value, such as a null value, maintained as identical to the updated next path indicator, a path set up message may be sent to the physical neighbor node identified in the next path segment indicator, and the like. If the next next path segment indicator is not a physical neighbor node, the routing node may search 1012 to check if the next next path segment indicator is a near physical neighbor. If so, the path can be routed through the physical neighbor which is linked to the near physical neighbor. The routing node may also check to see if the endpoint is a physical neighbor and/or initiate a local search in a suitable manner, such as a broadcast query search, and the like.

To prepare the data store to allow a search for near physical neighbor nodes, received hello messages may be parsed to determine nodes that are within one hop (physical neighbor nodes) as well as determine nodes that are within two hops (near physical neighbor nodes). More particularly, as noted above, a hello message may include the physical neighbor node set of the sending node. In this manner, the receiving node may store the node identifiers from the hello message physical neighbor set as near neighbor nodes and associate them with the sending node in an appropriate data store, such as the physical neighbor data store and/or the routing data store. Since the hello message may also indicate the state of the listed physical neighbor nodes, the receiving node may parse the listed near neighbor nodes and store only those nodes which have an indicated state of Linked. For example, with reference to FIG. 8, a receiving node may parse the hello message to retrieve the indicated neighbor node set of the sending node. The receiving node may then generate a new record in its routing data store with the first destination identifier as itself and the second node identifier as one of the node identifiers from the physical neighbor set of the hello message. The associated second path segment identifier may reference the path segment from the receiving node to the sending node. In this manner, the search 1012 may include an examination of the routing data store (or other appropriate data store) which includes the near neighbor nodes of the node associated with the failed link.

Returning to FIG. 10, if such a physical neighbor node exists and is found 1014, the failed path segment may be repaired 1016 by replacing the failed path segment with a path segment from the routing node to the found physical neighbor node, and from the found physical neighbor node to either the node indicated by the next next path segment indicator, the node indicated in the next path segment indicator, or the endpoint or final destination node identifier. If such a node cannot be found, then the routing node may proceed to tear down 1018 the entire path as discussed above. The routing node may send a message to the node now referenced by the updated next path segment indicator. In this manner, the node indicated by the next path segment indicator may update its own routing data store appropriately. Similarly, another message may be sent too similarly update the routing table of the node indicated by a new next next path segment indicator.

If the second path segment indictor indicates the failed path segment 1005, then the routing node may delay 1020 teardown of the associated path. More particularly, the routing node may delay teardown for a period of time to wait for the node on the other side of the failed path segment to detect the failure. Any suitable delay period may be used. For example, the routing node may wait for a period of time approximately equal to the expected time for the node on the other side of the link to detect the failure, which may be represented as (k+1)t. The delay period may also include an additional amount of time such as δt, which is some extra time for the other node to complete the repair. If during the delay period, the routing node receives 1022 a path repair message from a node wishing to repair the entry for the path, the routing node may cancel 1024 the tear down. If no message is received, then the routing node may proceed to tear down 1018 the path.

Using the above described local tear down process, the path state may be successfully repaired locally or may be completely torn down, even in the presence of multiple concurrent failures. The local tear down process may use local consistency checks that are conservative and trigger tear downs both when true inconsistencies occur as well as to manage complex but infrequent cases. However, it is to be appreciated that any appropriate inconsistency checks may be used as depends on the application.

Virtual Ring Maintenance

In addition to setting up and maintaining the paths between physical neighbor nodes through the network topology, the virtual ring architecture requires the maintenance of the virtual neighbors. The physical path between two virtual neighbors may include one or more hop segments between physical nodes. When a message is routed, each routing node forwards the message closer to it's intended destination node in the node identifier space, e.g. the virtual ring. Each node is required to maintain a physical path to each of it's virtual neighbors.

Physical Path SetUp Requests

In order to allow a node to maintain its virtual neighbors, in addition to the path set up message used in the physical path set up, a node may also send an additional primitive that requests that another node create a physical path to it. This physical path setup request allows a node to request a physical path be setup and/or to exchange current virtual neighbor sets. Physical path setup requests may be implemented in any suitable manner, such as by the routing module 220 of FIG. 2.

In one example, a requesting node with an identifier x may want a node whose identifier is y to create a path to it. More particularly, with reference to the method 1100 of FIG. 11, a requesting node may select 1102 a proxy node. Although the proxy node may be selected in any suitable manner, the requesting node may select the proxy node randomly or in a predetermined manner. Moreover, the proxy node may be selected from any set of node identifiers. For example, the proxy node may be selected from the set of physical neighbor nodes of the requesting node, e.g., from the requesting node's physical neighbor set. As an alternative to sending a setup request message through a proxy node, the requesting node having a node identifier x may send a setup request message directly to a node identifier y(e.g., without routing through a proxy node).

The requesting node may generate 1104 a setup request message. The setup request message may be in any suitable form and in accordance with any suitable protocol. In one example, the hop set up message may include one or more of a hop set up request identifier, the node identifier for the requesting node, the node identifier y, the node identifier for the selected proxy node, a proxy passed indicator, a virtual neighbor node set indicator, and the like. The setup request identifier may identify that the message is a setup request, may uniquely identify the setup request message, and the like. The proxy passed indicator may indicate whether the message has already passed the proxy. For example, the proxy passed indicator may be initially set to null or some predetermined value which indicates that the message has not passed the proxy node. When the proxy node receives the setup request message, it may update the proxy passed indicator to a predetermined value which indicates that the message has passed the proxy node. The virtual neighbor node set indicator may include a listing of all or a portion of the node identifiers of the virtual neighbor nodes of the requesting node.

The requesting node may send 1106 the setup request message to the proxy node. A receiving node may receive 1108 the setup request message, and parse 1110 the message. If the proxy node has been passed 1112, the receiving node may forward 1118 the setup request message through the network topology toward the node identifier y. For example, the receiving node may forward the setup request message over a path segment in the network topology to a physical neighbor node with a node identifier closest to the indicated value y, by using the routing algorithm discussed above. Alternatively, the setup request message may be forwarded to the physical neighbor which is the next hop for a path with a destination that is closest to the node identifier y.

If the proxy node has not been passed 1112, the receiving node may determine 1114 if it is the indicated proxy node. If so, then the receiving node may update 1120 the proxy passed indicator to indicate that the message has passed the proxy. The receiving node may then forward 1118 setup request message to the indicated node identifier y, such as by using the routing algorithm discussed above. If the receiving node is not the proxy node, then the receiving node may forward 1116 the message through the network topology towards the indicated proxy node. Each receiving node may process and forward the hop set up message until the hop set up message reaches the indicated node having a node identifier closest to the value y.

If the setup request message is not dropped, the setup request message may be received 1122 by the destination node having a node identifier equal to or numerically closest to the indicated value y within the node identifier name space. The destination node may parse the message 1124 to determine the node identifier of the requesting node. The destination node may compare 1126 the requesting node's node identifier with the node identifiers listed in its own virtual neighbor set. If the request node's node identifier is numerically closer to the node identifier of the destination node than other nodes within the virtual neighbor set (e.g., the destination node and the requesting node are virtual neighbors), then the destination node may update 1128 its virtual neighbor node set to include the requesting node's node identifier. To update 1128 the virtual neighbor node set, the destination node may also remove one current virtual neighbor node from the virtual neighbor node set based on the protocol governing the neighbor node set.

If the destination node determines 1126 that the original requesting node identifier is a virtual neighbor node, the destination node may send 1130 a routing path setup message (as discussed above with reference to Routing Path Set up) message back to the requesting node x through the proxy node indicated in the received setup request message. If the original requesting node x receives 1132 the routing path setup message (most likely, but not necessarily, from the proxy node), the original requesting node may parse 1134 the message to determine the node identifier for the destination node, which may or may not be equal to the value y. The requesting node may compare 1136 the node identifier of the destination node with its own virtual neighbor set and determine if the destination node is a virtual neighbor according to the protocol of the virtual neighbor set. If so, the requesting node x may update 1138 its own routing data store to include the indicated path to the destination node as a new virtual neighbor node. Similarly, the routing path setup will set up a physical path between the receiving node and the requesting node x. If the destination node identifier is not a valid neighbor node, the requesting node may take an appropriate action, such as sending a teardown request to the destination node, sending a message indicating an alternative neighbor node, and the like.

If the node identifier of the requesting node is not a valid virtual neighbor node of the destination node 1126, the destination node may take an appropriate action 1142. For example, the destination node may drop the setup request message. In this manner, if the requesting node does not receive a response to its setup request message within a predetermined period of time, the requesting node may assume that either the setup request message did not reach a destination node, that the destination node is not a virtual neighbor of the requesting node, and/or that the requesting node is not a virtual neighbor of the destination node (e.g., if the virtual neighbor sets are not symmetric). An alternative appropriate action may include the destination node sending a setup request reply message to the requesting node, which may be sent through the proxy node. The setup request reply message may have the same format as a setup request message. However, as noted above, the requesting node which receives the setup request reply message may determine 1136 that the destination node sending the setup request reply message is not a correct virtual neighbor node, using the virtual neighbors in the setup request reply message, and may take 1140 its own appropriate action, such as sending a path tear down request message.

If the receiving node does not receive a response to its setup request message or a setup request reply message from the destination node indicates that the destination node is not a suitable virtual neighbor node, the requesting node may select 1102 another proxy node, and repeat the above process until a suitable virtual neighbor node is found. As noted above, setup request message and/or setup request reply message may be acknowledged and/or retransmitted at each hop along the path through the network topology.

Figure 11:
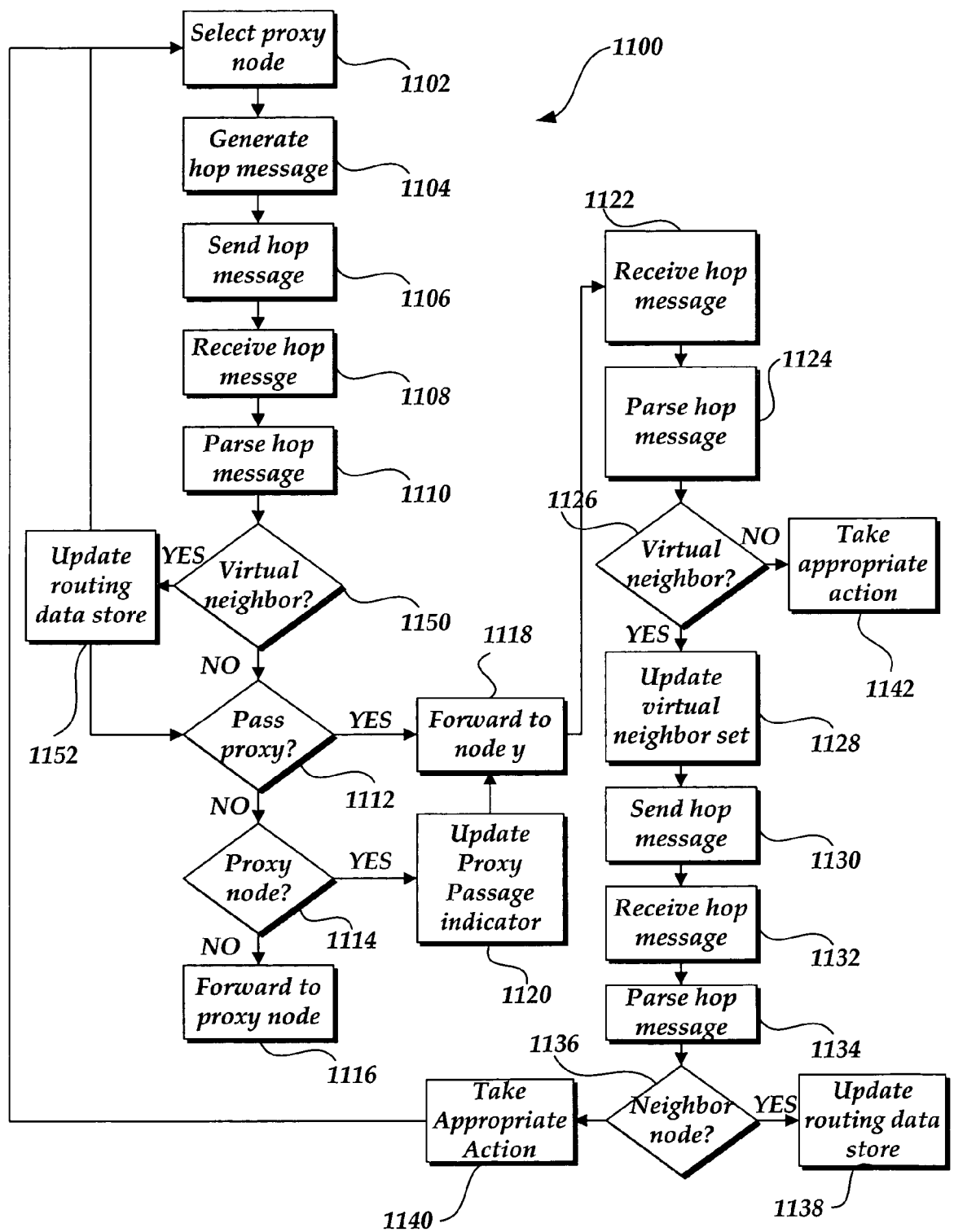
FIG. 11 is a flow chart of an example method for setting up a hop to a virtual neighbor node.

With reference to the method of FIG. 11, when a node that is either the destination or closest to the destination in the virtual ring receives 1108 any type of message with a virtual neighbor set indicated therein, the receiving node may parse 1110 the message to examine the node identifier(s) indicated in the virtual neighbor set of the message. If any of the nodes should be incorporated into the virtual neighbors of the receiving node 1150, the receiving node may update 1152 its routing data store appropriately. Additionally or alternatively, the receiving node may generate 1104 and sending 1106 a setup request message to that node. The receiving node may delay updating its routing data store until it receives a setup request reply message and/or routing path setup from the indicated neighbor node. This technique may reduce convergence problems due to the addition of failed nodes.

It is to be appreciated that any type of virtual network setup and/or maintenance technique between virtual neighbor nodes may be used, such as those used in association with any peer-to-peer network such as Tapestry developed at the University of California at Berkeley, Chord developed at the Massachusetts Institute of Technology, Pastry developed at Microsoft and Rice University, CAN, Kademlia, Skipnet, Viceroy or any other suitable peer-to-peer network.

Virtual Neighbor Set Initialization

Figure 12:
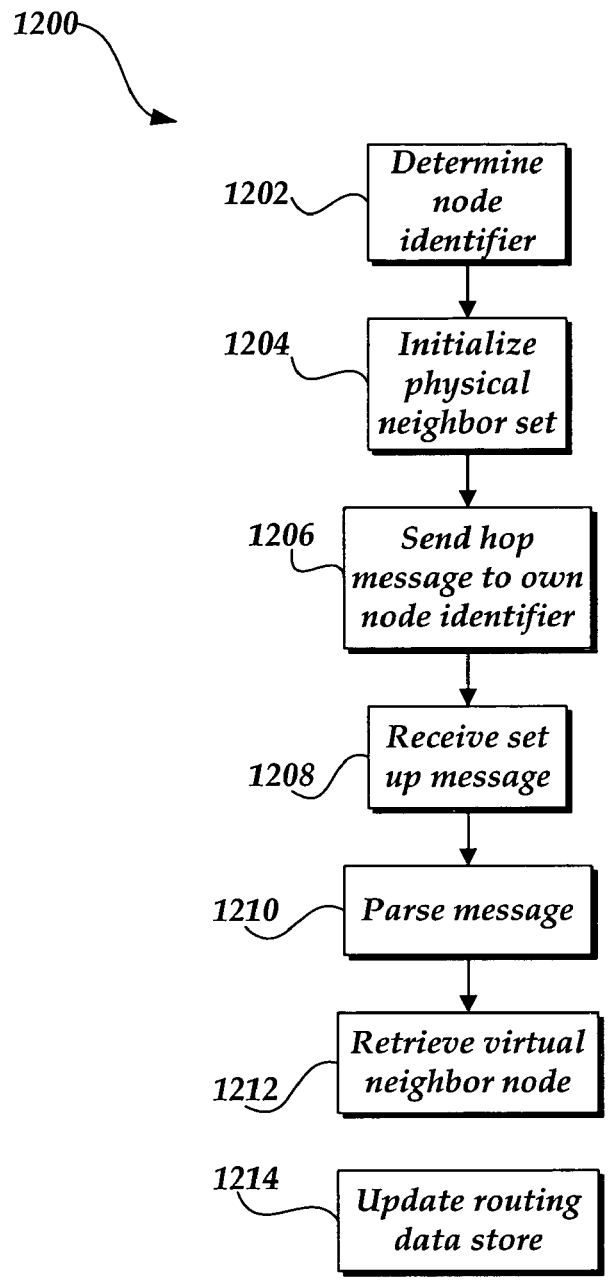
FIG. 12 is a flow chart of an example method for joining as a node of the virtual ring of FIG. 3.

When a node joins the virtual ring, the joining node may initialize its virtual neighbor set and/or set up routing path segments to those virtual neighbors. FIG. 12 illustrates an example method 1200 of joining a node to the virtual ring. Initially, the joining node may determine 1202 its own node identifier. The node identifier for the joining node may be determined in any suitable manner and by any suitable entity. For example, the node identifier may be assigned by a third party, such as a certification authority. Alternatively, the node identifier may be generated by the node itself. For example, the node identifier may be a hash of the node's public key. It is to be appreciated that any suitable node identifier within the node identifier name space may be determined.

The joining node may initialize 1204 its physical neighbor set. For example, the physical neighbor set may be initialized by the joining node by broadcasting an initialization hello message. The initialization hello message format may be similar to the hello message discussed above. However, in some cases the initialization hello message may include an initialization indicator which may trigger a particular response from a receiving node. More particularly, a receiving node receiving the initialization hello message may process the hello message as discussed above with reference to FIG. 8, however, the initialization indicator may trigger the receiving node to send a response or acknowledgement immediately or at least within a short period of time. In this manner, the period of time to join the joining node may be decreased.

The virtual neighbor node set may be initialized by sending 1206 a setup request message to its own node identifier through a proxy node selected from the physical neighbor set. In this manner, the joining node receives 1208 a routing path setup message in response to its own setup request message. The joining node may parse 1210 the received routing path setup message to retrieve 1212 the virtual neighbor node set included by the node sending the routing path setup message. The joining node may then store the virtual neighbor node identifiers in any suitable manner and in any suitable location, such as in the routing data store, and then issue routing path setup messages the other nodes in the virtual neighbor set.

If the node identifiers are fairly short compared to the number of nodes within the virtual ring, the probability of two nodes choosing the same identifier may not be negligible. Accordingly, node identifier collisions may be reduced in any suitable manner, such as by expanding the node identifier name space, assigning or verifying the node identifiers with a certification authority, resolving detected identifier collisions, and the like.

A node identifier collision may be detected when a request setup message is delivered to a node that has the same node identifier as the requestor. Accordingly, the receiving node may send a collision detection message to the joining node, which may be routed through the indicated proxy node, with information about the collision. The collision detection message may be in any appropriate format and in accordance with any suitable protocol. When a joining node receives a collision detection message, it may select another node identifier and reinitiate the join process, such as the described above with reference to FIG. 12.

Virtual Neighbor Node Set Repair

The virtual neighbor node set may be repaired from time to time, such as when nodes and/or links fail and/or leave the virtual ring. For example, virtual neighbor node set repair may be triggered when a node detects that a path to one of its virtual neighbor nodes has failed. The node may detect the failure in any suitable manner, including, for example, receiving a tear down message for the path, the state for the next path segment identifier is Failed, and the like.

More particularly, a node may detect that a path to a virtual neighbor node is failed, which may signal that the virtual neighbor node itself failed or that some path segment in the physical path through the network topology between the node and its virtual neighbor node has failed. If the virtual neighbor node has failed, then the node may replace the virtual neighbor node with another suitable node identifier for an active node within the virtual ring. However, if one or more path segments have failed within the physical path from the node to the virtual neighbor node, then the node may create a new physical path to the virtual neighbor node. The node needs to determine if the virtual neighbor node is alive or if the physical path failed.

In some cases, to find a new virtual neighbor node at the same time as finding a new route to the original virtual neighbor node, the node may remove the original virtual neighbor node from its virtual neighbor node set, e.g., may remove the record indicating the path to and from the original virtual neighbor node from the routing data store. The node may also send a setup request message with the node identifier of the original virtual neighbor node as the node identifier y. The setup request message may be sent through any appropriate proxy node, which may be randomly determined. The setup request message may trigger the stabilization method described above with reference to FIG. 11, and may repair the node's virtual neighbor node set as well as the path segment identifiers to the virtual neighbor nodes.

In some other cases, the setup request message may be lost, even after being retransmitted (and/or acknowledged) several times, the node detecting the failure may be the identifier that is numerically closest to the failed node in the ring (e.g., resulting in the setup request message being routed to itself), and the like. In these cases, the node may send a setup request message to a virtual neighbor node on the side of the ring occupied by failed virtual neighbor node. The same side virtual neighbor may reply with a setup request reply message that may include one or more candidate virtual neighbor nodes that the node can use to replace the failed virtual neighbor node. If there is no virtual neighbor on the side of the ring occupied by the failed node, the node may repeat the join procedure and/or attempt use other techniques to attempt to discover suitable virtual neighbors.

In one example, a method may comprise determining a first node identifier to a first node of a network, the first node identifier being fixed and location-independent; determining a second node identifier of at least one second node which is a physical neighbor node of the first node within the network topology; determining a third node identifier of at least one third node which is a virtual neighbor of the first node within a node identifier namespace containing the first node identifier, the second node identifier, and the third node identifier; generating a path set up message including the first node identifier, the second node identifier, and the third node identifier; and sending the path set up message to the second node based on the second node identifier to set up a path segment between the first node and the second node. The method may further comprise setting up a route between the first node and the third node including sending a set up request message to the third node through the path segment and through at least one intermediate node, the set up request message including the first node identifier and the third node identifier. The method may further comprise determining if at least a portion of the route between the first node and the third node has failed. The method may further comprise sending a tear down message to the third node, through the at least one intermediate node in the route, to tear down the route. The method may further comprise locally repairing the route by the at least one intermediate node. The method may further comprise routing the setup request message through the network topology based on the third node identifier. The method may further comprise storing a path segment identifier associated with the second node identifier in a routing data store. The method may further comprise sending a hello message to the second node identifier, the hello message including the first node identifier, the second node identifier, and a second state indicator of the second node identifier, the second state indicator indicating a state of the second node as determined by the first node. The method may include the second state indicator being selected from the group consisting of Linked, Failed, and Pending. The method may further comprise receiving the hello message at the at least one second node and updating at the at least one second node a first state indicator of the first node based on the second state indicator and the first state indicator. Updating the first state indicator may include updating the first state indicator to Pending if the second state indicator is null and the first state indicator is null, if the second state indicator is Pending and the first state indicator is one of null and Pending, and if the second state indicator is Failed and the first state indicator is one Pending and Failed; wherein updating the first state indicator includes updating the first state indicator to Linked if the second state indicator is Pending and the first state indicator is one Linked and Pending, if the second state indicator is Linked and the first state indicator is one of Linked and Pending, and if the second state indicator is null and the first state indicator is Pending; and wherein updating the first state indicator includes updating the first state indicator to Failed if the second state indicator is null and the first state indicator is one of Linked and Failed, if the second state indicator is Failed and the first state indicator is one of Missing and Linked, and if the second state indicator is Linked and the first state indicator is one of null and Failed. The hello message may include a fourth node identifier and a fourth state indicator indicating a state of the fourth node as determined by the first node, and second node updating a fifth state of the fourth node as determined by the second node based on the fourth sate indicator and the fifth state indicator. The method may further comprise storing the fourth node identifier as a near neighbor node associated with the first node identifier.

Having described and illustrated the principles of our invention with reference to the illustrated embodiments, it will be recognized that the illustrated, embodiments can be modified in arrangement and detail without departing from such principles. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. A method comprising:
    assigning a fixed, location independent node identifier to each of a plurality of nodes in a physical network;
    identifying virtual neighbor nodes of the plurality of nodes in a virtual ring based on the node identifiers;
    maintaining at least one routing path in the physical network between at least two virtual neighbor nodes;
    setting up a new routing path in the physical network between the at least two other virtual neighbor nodes using the at least one routing path between the at least two virtual neighbor nodes;
    routing a message between any pair of the plurality nodes using the at least one routing path between virtual neighbor nodes;
    routing a message having a key to a receiving node having a node identifier closest to the key using the at least one routing path between virtual neighbor nodes;
    wherein setting up the new routing paths includes identifying a first physical neighbor node of a first virtual neighbor node, generating a setup request message, and sending the setup request message from the first virtual neighbor node to a second virtual neighbor node through the first physical neighbor node.

2. The method of claim 1, wherein generating the setup request message includes generating the setup request message to include a first node identifier of the first virtual neighbor node, a second node identifier for the second virtual neighbor node, and a virtual neighbor node set indicator including at least one other virtual neighbor node of the first virtual neighbor node.

3. The method of claim 1, wherein identifying a first physical neighbor node includes receiving a hello message from the first physical neighbor node.

4. The method of claim 3, wherein the hello message includes a first physical neighbor node set including the first node identifier of the first virtual neighbor node and a first state indicator indicating a state of the first virtual neighbor node determined by the first physical neighbor node.

5. The method of claim 4, wherein the first state indicator indicates a state selected from the group consisting of Linked, Failed, and Pending.

6. The method of claim 5, further comprising updating at the first neighbor node a second state indicator of the first physical neighbor node based on the first state indicator of the hello message.

7. The method of claim 6, wherein updating includes updating the second state indicator to Pending if a stored second state indicator is Missing and the first state indicator is Missing, if the first state indicator is Pending and a stored second state indicator is Failed, and if the first state indicator is Failed and a stored second state indicator is one of Pending and Failed; wherein updating includes updating the second state indicator to Linked if the first state indicator is Pending and a stored second state indicator is one of Linked, Pending and Missing, if the first state indicator is Linked and a stored second state indicator is one of Linked and Pending; and wherein updating includes updating the second state indicator to Failed if the first state indicator is Missing and a stored second state indicator is one of Linked and Failed, if the first state indicator is Failed and a stored second state indicator is one of Missing and Linked, and if the first state indicator is Linked and a stored second state indicator is one of Missing and Failed.

8. The method of claim 7, wherein the hello message includes a fourth node identifier of a fourth physical neighbor node of the first physical neighbor node, and a fourth state indicator indicating a state of the fourth node as determined by the first physical neighbor node, the first virtual neighbor node updating a fifth state of the fourth node as determined by the first virtual neighbor node based on the fourth state indicator and a stored fifth stat indicator of the fifth node.

9. The method of claim 8, further comprising storing the fourth node identifier as a near neighbor node associated with a node identifier of the first physical neighbor node.

10. The method of claim 1, wherein maintaining at least one routing path includes storing, the first virtual neighbor node, a next path segment indicator for each virtual neighbor node of the first virtual neighbor node.

11. The method of claim 1, wherein maintaining at least one routing path includes determining if at least a portion of the path between the first virtual neighbor node and the second virtual neighbor node has failed.

12. The method of claim 11, wherein maintaining at least one routing path includes sending a path tear down message to at least one of the first virtual neighbor node and the second virtual neighbor node through the first physical neighbor node to tear down the path.

13. A computer readable storage medium or volatile or non-volatile memory storing computer instructions which when executed by a computer, having stored thereon a routing data structure, the structure comprising:
  a first data field containing data representing a first node identifier of a virtual neighbor node of the routing node within a node identifier name space;
  a second data field associated with the first data field and containing data representing a first next path segment identifier indicating a first path segment through a network topology for a message to be routed to the first node identifier;
  a third data field containing data representing a second node identifier of a physical neighbor node of the routing node within the network topology;
  a fourth data field containing data representing a third node identifier of an end-point node of a path through the network topology which includes the routing node as an intermediate node;
  a fifth data field associated with the fourth data field and containing data representing a second next path segment identifier indicating a second path segment through the network topology for a message to be routed to the third node identifier, each of the first node identifier, the second node identifier, and the third node identifier being fixed and location-independent indications of an associated node.

14. The computer readable storage medium or memory of claim 13, wherein the first path segment identifier and the second path segment identifier include a node identifier of a physical neighbor node of the routing node.

15. The computer readable storage medium or memory of claim 13, further comprising a sixth data field associated with the fourth data field, the sixth data field containing data representing a fourth node identifier of another end-point of the path, and a seventh data field associated with the sixth data field, the seventh data field containing data representing a third next path segment identifier through the network topology for a message to be routed to the fourth node identifier.

16. The computer readable storage medium or memory of claim 13, further comprising an eighth data field associated with the third data field, the eighth data field containing data representing a state of the physical neighbor node having the second node identifier.

17. The computer readable storage medium or memory of claim 13, further comprising a ninth data field associated with the fourth data field, the ninth data field containing data representing a next path segment identifier indicating a fourth path segment through the network topology which is immediately after the second path segment in routing a message to the third node identifier.

18. One or more computer readable storage media or volatile or non-volatile memory devices storing computer instructions, the computer instructions which when executed by a computer comprising:
  means for routing a message through a network topology based on a fixed and location independent node identifier;
  means for routing a message through a virtual name space based on the fixed and location independent node identifier;
  means for determining at least one physical neighbor node within the network topology;
  means for determining a state of the at least one physical neighbor node within the network topology;
  means for determining at least one virtual neighbor node within a name space of the node identifier;
  means for estimating a link quality of a link between two physical neighbor nodes, such that the means for estimating a link quality includes a link quality indicator which may be a numerical indicator of the quality of the link between the two physical neighbor nodes; and
  means for setting up a route between virtual neighbor nodes.

19. The computer readable media of claim 18, further comprising at least one of means for tearing down a path between two virtual neighbor nodes, means for locally repairing a failed link in the network topology, and means for storing the set up route, the state of the at least one physical neighbor node, a node identifier of the at least one physical neighbor node, and a node identifier of the at least one virtual neighbor node.

* * * * *